(12) United States Patent
Krishan

(10) Patent No.: US 12,267,321 B2
(45) Date of Patent: Apr. 1, 2025

(54) METHOD AND SYSTEM FOR PERFORMING USER AUTHENTICATION

(71) Applicant: Baldev Krishan, Pleasanton, CA (US)

(72) Inventor: Baldev Krishan, Pleasanton, CA (US)

(*) Notice: Subject to any disclaimer, the term of this patent is extended or adjusted under 35 U.S.C. 154(b) by 187 days.

(21) Appl. No.: 18/171,271

(22) Filed: Feb. 17, 2023

(65) Prior Publication Data
US 2023/0269249 A1    Aug. 24, 2023

Related U.S. Application Data

(60) Provisional application No. 63/268,367, filed on Feb. 22, 2022.

(51) Int. Cl.
*H04L 29/06* (2006.01)
*H04L 9/40* (2022.01)

(52) U.S. Cl.
CPC ...... *H04L 63/0861* (2013.01); *H04L 63/0838* (2013.01); *H04L 63/102* (2013.01)

(58) Field of Classification Search
CPC .................................................. H04L 63/0861
See application file for complete search history.

(56) References Cited

U.S. PATENT DOCUMENTS

| | | | |
|---|---|---|---|
| 7,483,984 B1 | 1/2009 | Jonker et al. | |
| 7,894,634 B2 | 2/2011 | Chung | |
| 7,941,664 B2 | 5/2011 | Wheeler et al. | |
| 7,945,034 B2 | 5/2011 | Gonen et al. | |
| 8,462,920 B2 | 6/2013 | Gonen et al. | |
| 8,687,038 B2 | 4/2014 | Gonen et al. | |
| 8,914,855 B2 | 12/2014 | Whitmyer, Jr. | |
| 9,088,556 B2 | 7/2015 | Truskovsky et al. | |
| 9,172,699 B1 | 10/2015 | Vazquez et al. | |
| 9,300,792 B2 | 3/2016 | Gonen et al. | |
| 9,467,443 B2 | 10/2016 | Mohan | |
| 9,762,392 B2 | 9/2017 | Carrer et al. | |

(Continued)

FOREIGN PATENT DOCUMENTS

| WO | WO-2016145454 A1 | 9/2016 |
|---|---|---|
| WO | WO-2020219771 A1 | 10/2020 |

OTHER PUBLICATIONS

U.S. Appl. No. 15/636,827 / U.S. Pat. No. 10,491,588, filed Jun. 29, 2017 / Nov. 26, 2019.

(Continued)

*Primary Examiner* — Bradley W Holder
(74) *Attorney, Agent, or Firm* — Eversheds Sutherland (US) LLP

(57) ABSTRACT

Systems and methods are provided involving a user registration and authentication system for granting access to digital systems, content, computing systems and devices, applications including document execution applications, and physical locations. The registration and authentication system may involve a personal device, a computing device and/or a server and may grant access to digital systems, applications, and content. The registration and authentication system may also involve a personal device, an interface device, a secure system and/or a server and grant access to computing systems, applications, devices and physical locations. A user may be registered for the authentication system in-person by a third-party to perform in-person verification.

20 Claims, 14 Drawing Sheets

(56) References Cited

U.S. PATENT DOCUMENTS

| | | | |
|---|---|---|---|
| 9,767,262 | B1 | 9/2017 | Canavor et al. |
| 9,860,241 | B2 | 1/2018 | Dixon et al. |
| 10,021,088 | B2 | 7/2018 | Innes et al. |
| 10,055,575 | B2 | 8/2018 | Adams et al. |
| 10,146,931 | B1 | 12/2018 | Kronrod et al. |
| 10,339,293 | B2 | 7/2019 | Yang et al. |
| 10,491,588 | B2 | 11/2019 | Krishan |
| 10,931,667 | B2 | 2/2021 | Krishan |
| 11,115,403 | B2 | 9/2021 | Krishan |
| 2004/0193925 | A1 | 9/2004 | Safriel |
| 2006/0104224 | A1 | 5/2006 | Singh et al. |
| 2006/0183462 | A1 | 8/2006 | Kolehmainen |
| 2007/0036400 | A1* | 2/2007 | Watanabe .......... G06V 40/1376 382/124 |
| 2007/0074038 | A1 | 3/2007 | Arenburg et al. |
| 2008/0010674 | A1 | 1/2008 | Lee |
| 2009/0042541 | A1 | 2/2009 | Yi et al. |
| 2013/0179692 | A1 | 7/2013 | Tolba et al. |
| 2013/0254856 | A1 | 9/2013 | Krishan |
| 2014/0101453 | A1 | 4/2014 | Senthurpandi |
| 2014/0173708 | A1 | 6/2014 | Garlick |
| 2014/0189808 | A1 | 7/2014 | Mahaffey et al. |
| 2014/0337930 | A1 | 11/2014 | Hoyos et al. |
| 2014/0359757 | A1* | 12/2014 | Sezan .................. G06F 21/32 726/19 |
| 2015/0143490 | A1 | 5/2015 | Fang |
| 2015/0278510 | A1 | 10/2015 | Alexander |
| 2015/0294313 | A1 | 10/2015 | Kamal et al. |
| 2015/0295930 | A1 | 10/2015 | Dixon et al. |
| 2016/0014457 | A1 | 1/2016 | Dua |
| 2016/0057136 | A1 | 2/2016 | Wang |
| 2016/0063235 | A1 | 3/2016 | Tussy |
| 2016/0269403 | A1 | 9/2016 | Koutenaei et al. |
| 2016/0359864 | A1 | 12/2016 | Dhaliwal et al. |
| 2016/0379220 | A1 | 12/2016 | Tunnell et al. |
| 2017/0019390 | A1 | 1/2017 | Gu |
| 2017/0076293 | A1 | 3/2017 | Cage et al. |
| 2017/0085563 | A1 | 3/2017 | Royyuru |
| 2017/0086069 | A1 | 3/2017 | Liu |
| 2017/0142191 | A1 | 5/2017 | Caldwell |
| 2017/0195319 | A1 | 7/2017 | Gerber et al. |
| 2017/0201513 | A1 | 7/2017 | Krempel et al. |
| 2017/0286656 | A1 | 10/2017 | Kohli |
| 2017/0310663 | A1 | 10/2017 | Krishan |
| 2018/0005209 | A1 | 1/2018 | Ranganathan et al. |
| 2018/0075231 | A1 | 3/2018 | Subramanian et al. |
| 2018/0176221 | A1 | 6/2018 | Zhou et al. |
| 2018/0176222 | A1 | 6/2018 | Bhaskar et al. |
| 2018/0183779 | A1 | 6/2018 | Krishan |
| 2019/0066114 | A1 | 2/2019 | Ross |
| 2019/0213430 | A1 | 7/2019 | Schwartz |
| 2019/0222570 | A1 | 7/2019 | Krishan |
| 2019/0268332 | A1 | 8/2019 | Wang |
| 2019/0370583 | A1 | 12/2019 | Van Os et al. |
| 2020/0296093 | A1* | 9/2020 | Hoyos .................. H04L 9/3247 |
| 2020/0358760 | A1 | 11/2020 | Krishan |
| 2021/0183235 | A1* | 6/2021 | Giobbi .............. G07F 17/3239 |

OTHER PUBLICATIONS

U.S. Appl. No. 15/897,195 / U.S. Pat. No. 11,115,403, filed Feb. 15, 2018 / Sep. 7, 2021.
U.S. Appl. No. 16/118,416 / U.S. Pat. No. 10,931,667, filed Aug. 30, 2018 / Feb. 23, 2021.
U.S. Appl. No. 16/962,787, filed Jul. 16, 2020.
U.S. Appl. No. 17/450,646, filed Oct. 12, 2021.
U.S. Appl. No. 17/466,590, filed Sep. 3, 2021.
U.S. Appl. No. 17/606,420, filed Oct. 25, 2021.
Agholor, et al., A Secured Mobile-Based Password Manager, 2016 Sixth International Conference on Digital Information Processing and Communications, pp. 103-108 (Apr. 2016).
Faisca, et al., Decentralized Semantic Identity, Proceedings of the 12th International Conference on Semantic Systems, pp. 177-180 (Sep. 2016).
International Search Report & Written Opinion dated Jun. 24, 2019 in Int'l. PCT Patent Appl. Serial No. PCT/US2019/013716 (0410).
International Search Report & Written Opinion dated Sep. 14, 2020 in Int'l PCT Patent Appl. Serial No. PCT/US2020029650 (0510).
Publication—1: iKeyVault Website (formally under iKeyPass), Four Screen Shots (pages), Published in Oct. 2016, Developed and published by Janani Mohan, prior to launching a crowd funding campaign with the crowd funding site Indiegogo, in Q1/Q2 2017, and distributed to the general public. The website can be accessed at www.ikeyvault.com.
Publication—2: A Plugin for WordPress Administrators, Four Screen Shots (pages) from the website. First Published in Oct. 2014, Developed and published by iKeyPass, Inc. and was available for download to the general public since 2014, The Plugin can be currently viewed and downloaded at https://wordpress.org/plugins/search/ikeypass/.
Publication—3: A downloadable Plugin available to the general public at the Google Chrome Store. Four Screen Shots from the website, Published in Jan. 2015, Developed and published by iKeyPass, Inc. and was available for download to the general public since Jan. 2015, The Plugin can be currently viewed and downloaded at https://chrome.google.com/webstore/detail/byoa/nbnkenkheongccomnjibebdfjl- cpcefh?hl=en.
Third-Party Submission Under 37 CFR 1.290 dated Feb. 11, 2018, filed with the U.S. Patent & Trademark Office against U.S. Appl. No. 15/636,827 (3 pages).
Wang, et al., IDKeeper: A Web Password Manager with Roaming Capability Based on USB Key, 2012 International Conference on Industrial Control and Electronics Engineering, pp. 1228-1231. (Aug. 2012).
Yang et al., Cloud Password Manager Using Privacy-Preserved Biometrics, 2014 IEEE International Conference on Cloud Engineering, pp. 505-509 (Mar. 2014).
Yu, et al., Research on a Security Enhanced Three Factor Remote User Identity Authentication Scheme, Software Guide, vol. 16(12):188-193 (Dec. 2017) (English Abstract Only).

* cited by examiner

METHOD AND SYSTEM FOR PERFORMING USER AUTHENTICATION

CROSS-REFERENCE TO RELATED APPLICATIONS

This application claims priority to U.S. Provisional Patent Application Ser. No. 63/268,367, filed Feb. 22, 2022, the entire contents of which are incorporated herein by reference.

TECHNICAL FIELD

The present disclosure generally relates to the field of user authentication. More specifically, the present disclosure relates to a system and method for performing user registration and authentication for access to digital systems and content, computing systems and devices, and physical locations.

BACKGROUND

While advanced computing systems and the Internet have made it easier to access digital information and computer devices, it has also made it increasingly difficult to restrict access to digital information, computing devices and even physical locations as modern technology has introduced several vulnerabilities that may easily be exploited. Though user verification systems are often employed to restrict access to certain information, devices, computer systems or physical locations, these systems may be inappropriately accessed through deception and/or hacking or by otherwise bypassing verification systems. Further, users may permit unauthorized access to the foregoing by sharing user name and/or password information.

With respect to access to digital content and computer devices and systems, unique usernames and password combinations may help protect against unauthorized access. However, users often forget usernames and passwords as users typically have multiple online accounts, each with a different username and password. Also, the users may leave their usernames and passwords in plain view or may use generic passwords that may be easily determined. While solutions such as token generators and one-time passwords (OTP) have been developed, these solutions are prone to being tampered with and/or hacked. Also, these solutions are often overly complex and costly and may even require users to carry separate devices that generate tokens or passwords, which may be easily misplaced.

Regarding access to physical locations, several well-known approaches exist. For example, physical key cards that have unique digital identifiers may be used in combination with proximity readers to grant users access through doors or gates. However, these systems may be expensive and require users to keep key cards on their person. Further, if the key card may be used by unauthorized individuals to gain access to the restricted area. Access to physical locations may also be granted by entering in a unique passcode. However, these systems require a computing device that is prone to the same vulnerabilities described above with respect to digital authentication.

Also, while it is now easy to digitally review documents and apply a digital signature using well-known document execution applications (e.g., DocuSign by DocuSign, Inc. and Adobe Sign by Adobe Inc.), validating the identity of the user applying the digital signature is extremely difficult. While current systems may involve conventional passwords, including a one-time password (OTP), tokens or SMS text (e.g., numbers/code), and may even involve unique security questions, this information can be hacked and easily misappropriated or guessed. While a link to open a document may be sent to an email of an individual, the email may be hacked or accessible on computer that has been left unattended.

Previous systems have been described such as U.S. Pat. No. 7,894,634 to Chung, U.S. Pat. No. 7,941,664 to Wheeler, U.S. Pat. No. 10,491,588 to Krishan, U.S. Patent App. Pub. No. 2018/0183779 to Krishan, U.S. Patent App. Pub. No. 2019/0213430 to Schwartz, and U.S. Patent App. Pub. No. 2019/0222570 to Krishan, the entire contents of each of which are incorporated herein by reference. Accordingly, there is a need for improved methods and systems for performing user authentication involving a simple authentication process that is cost efficient, less susceptible to hacking and unauthorized password sharing, and otherwise overcomes one or more of the above-mentioned problems and/or limitations.

SUMMARY OF THE INVENTION

The present invention is directed to an authentication and registration system for authenticating a user to provide access to digital systems and content, computing systems and devices, and physical locations. The authentication system preferably involves software that runs on at least one personal device having at least one biometric sensor and at least one computing device that may be an interface device. The personal device runs a mobile application and includes a display having a user interface. The authentication system may further include software that runs on at least one server that communicates with the personal device. The personal device is in communication with the computing device or interface device. The server is in communication with the computing device or interface device and may be in communication with the personal device.

In embodiments, the present invention is a system for user registration and authentication comprising memory configured to store computer-executable instructions and at least one computer processor configured to access memory and execute the computer-executable instructions to i) receive a request to generate a user profile associated with a user from an on-sight verification system; ii) generate a user profile associated with the user; iii) request user verification from an on-sight verification system; iv) receive user verification information indicative of user verification confirmation; v) request user information comprising biometric information and personal device information from the on-sight verification system; vi) receive the user information from the on-sight verification system; vii) associate the user information with the user profile; viii) receive a request for authentication from a computing device, the request for authentication corresponding to a user profile; and ix) send a request for authentication information to personal device corresponding to the user information associated with the user profile.

In embodiments, the at least one computer processor is further configured to access memory and execute the computer-executable instructions to i) receive authentication information from personal device; ii) determine the authentication information satisfies at least a portion of the biometric information; and iii) instruct the computing device that authentication was successful. In embodiments, the authentication information comprises one or more of iris data, a face data, a fingerprint data and speech data. In embodiments, the biometric information comprises one or more of an iris data, a face data, a fingerprint data and speech data.

In embodiments, the at least one computer processor is further configured to access memory and execute the computer-executable instructions to associate the personal device corresponding to the user information with the user profile. In embodiments, the at least one computer processor is further configured to access memory and execute the computer-executable instructions to send a one-time passcode (OTP) to the personal device corresponding with the user information and receive the OTP from the personal device.

In embodiments, the at least one computer processor is further configured to access memory and execute the computer-executable instructions to grant the personal device access to a mobile authentication application. In embodiments, the user verification information is based on an identification card and/or the request for authentication may include a passcode and a user identification value. In embodiments, the at least one computer processor is further configured to access memory and execute the computer-executable instructions to determine the user profile is associated with the user identification value and confirm the passcode matches a passcode associated with the user profile.

In embodiments, the present invention is directed to a method for user registration on an authentication system comprising i) connecting a computer device; ii) receiving a request to generate a user profile associated with a user and at least one personal device; iii) generating a user profile corresponding to a user and the at least one personal device; iv) requesting onsite user verification from the computing device; v) receiving user verification confirmation from the computing device; vi) requesting biometric information corresponding to the user from the computing device; vii) receiving first biometric information corresponding to the user from the computing device; viii) associating first biometric information with the user profile; iv) sending, after receiving user verification from the computing device and receiving the first biometric information, a one-time-passcode to a personal device associated with the user profile; x) receiving the one-time-passcode from the personal device; xi) sending, after receiving the one-time-passcode, a request for authentication to the personal device; xii) receiving second biometric information from the personal device; and xiii) determining that the second biometric information corresponds to the first biometric information.

In embodiments, the method further comprises sending message to the computing device confirming that registration is complete based on determining that the second biometric information corresponds to the first biometric information. In embodiments, the method further comprises receiving the user verification information and associating the verification information with user profile.

In embodiments, the biometric information is a finger print, speech data, face scan, photograph of the user, a retinal scan, and/or an iris scan. In embodiments, the personal device is a mobile phone. In embodiments, the method further comprises requesting second biometric information corresponding to the user from the computing device, receiving second biometric information corresponding to the user from the computing device; and associating second biometric information with the user profile.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present invention will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

The present invention is directed to a user authentication system that performs authentication tasks to grant a user access to a digital content, computing systems and devices, applications including document execution applications, and/or physical locations or objects. The user authentication system involves a personal device that runs a user authentication application that performs authentication tasks. The personal device may be any computing device, including but not limited to a mobile device, tablet, personal computer, smart watch, wearable or the like. The personal device may communicate with at least one other computing device (e.g., a server) to access to digital content, computing systems, applications, and devices and/or physical locations or objects upon successful authentication.

Figure 1:
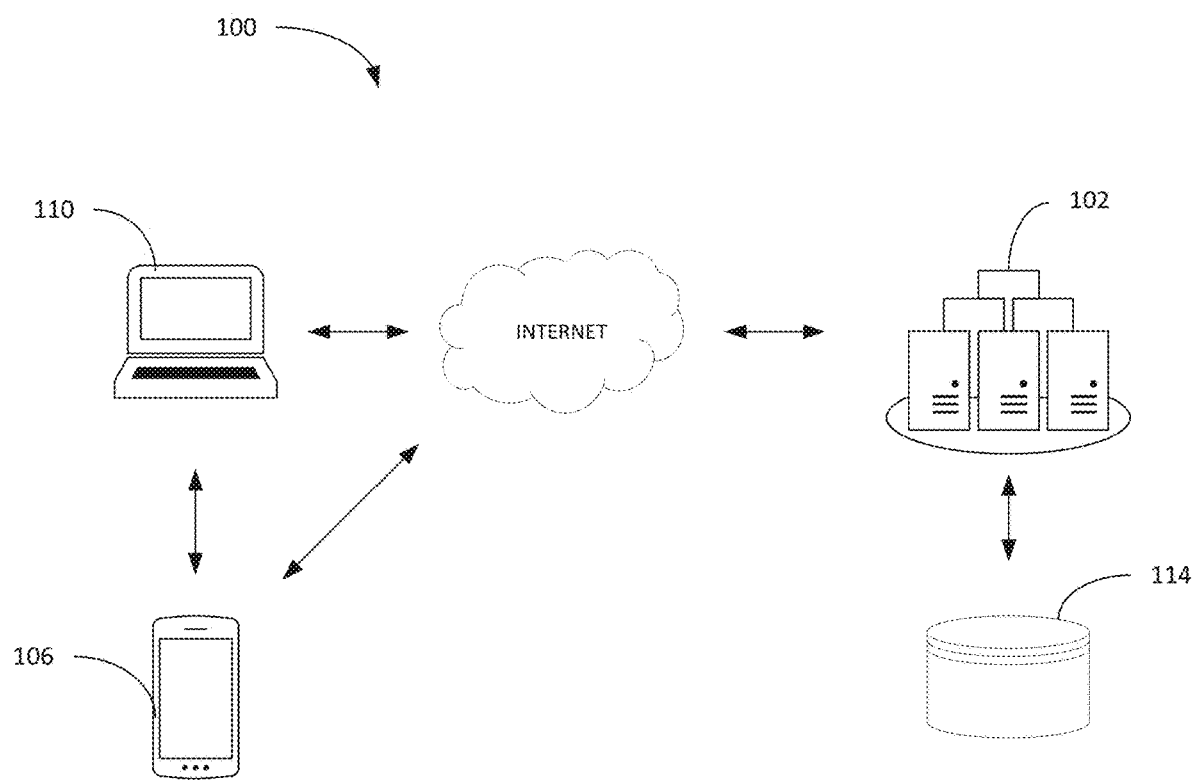
FIG. 1 illustrates an exemplary authentication system for granting access to digital content in accordance with aspects of the present invention.

Referring now to FIG. 1, exemplary user authentication system 100 is illustrated. User authentication system 100 is designed to perform user authentication on personal device 106 and grant access to digital content and systems. For example, user authentication system 100 may grant a user using personal device 106 access to a web browser, a web portal or other software systems.

User authentication system 100 involves personal device 106, computing device 110, server 102 and database 114. Personal device 106 may be any device having processing power, storage, network connectivity, an input device, a display and preferably at least one biometric sensor. For example, personal device 106 may be a mobile phone, personal computer, laptop, tablet or any other computing device having the foregoing features. Computing device 110 may be any device having processing power, storage, network connectivity, an input device and/or a display. For example, computing device 110 may be a laptop, personal computer, mobile phone, tablet or any other computing device having the foregoing features. Server 102 is one or more servers that is hosted and delivered through a cloud computing platform over the Internet, such as, for example, a cloud computing service. Server 102 may have the same components as computing device 110 but includes at least processor and network connectivity. Database 114 is a database that may include information such as the user profile, user identification information, authorization information, registration information, and/or credential information, as defined below, as well other information relevant to the authentication system. Database 114 may be stored on or otherwise incorporated into or part of server 102 or may be stored elsewhere and accessed by server 102.

Personal device 106 is configured to run mobile application 318. Mobile application 318 may be any mobile software application configured to run on personal device 106 and generate a user interface on personal device 106, and programmed to perform the tasks executed on personal device 106 described herein. Computing device 110 is configured to run application 220. Application 220 is a software application that may be web-based and that is configured to be executed on computing device 110 and/or hosted on server 102 and accessed via computing device 110.

Personal device 106 running mobile application 318 may communicate with computing device 110 running application 220 to perform the operations herein described with respect to authentication system 100. Application 220 may be installed by the user on computing device 110 or installed on the backend of a website or web-based application. Personal device 106 may communicate with computing device 110 via any well-known wired or wireless connection, described in further detail below. Personal device 106, running mobile application 318, may connect to the Internet using any well-known methods and may communicate with computing device 110 and/or server 102 over the Internet. It is understood that personal device 106 may communicate with computing device 110 and server 102 using different communication technologies or the same communication technologies. It is further understood that in some cases personal device 106 may communicate directly with server 102 (e.g., over the Internet). Where database 114 is not stored on server 102, server 102 may access database 114 over the Internet or over any well-known wired or wireless connection.

Figure 2A:
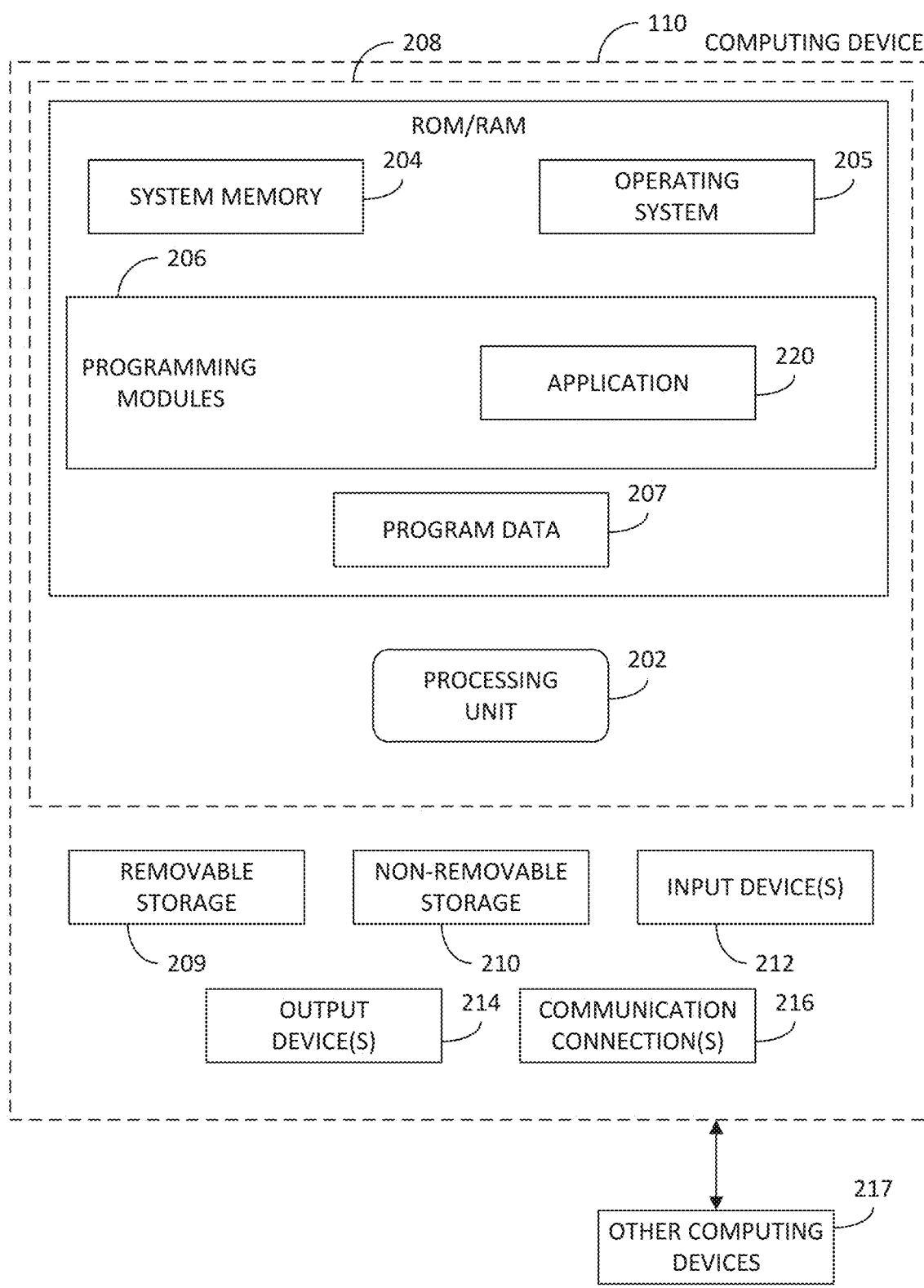
FIGS. 2A-2B are schematic views of exemplary software and hardware components of the computing device and the personal device.
Figure 2B:
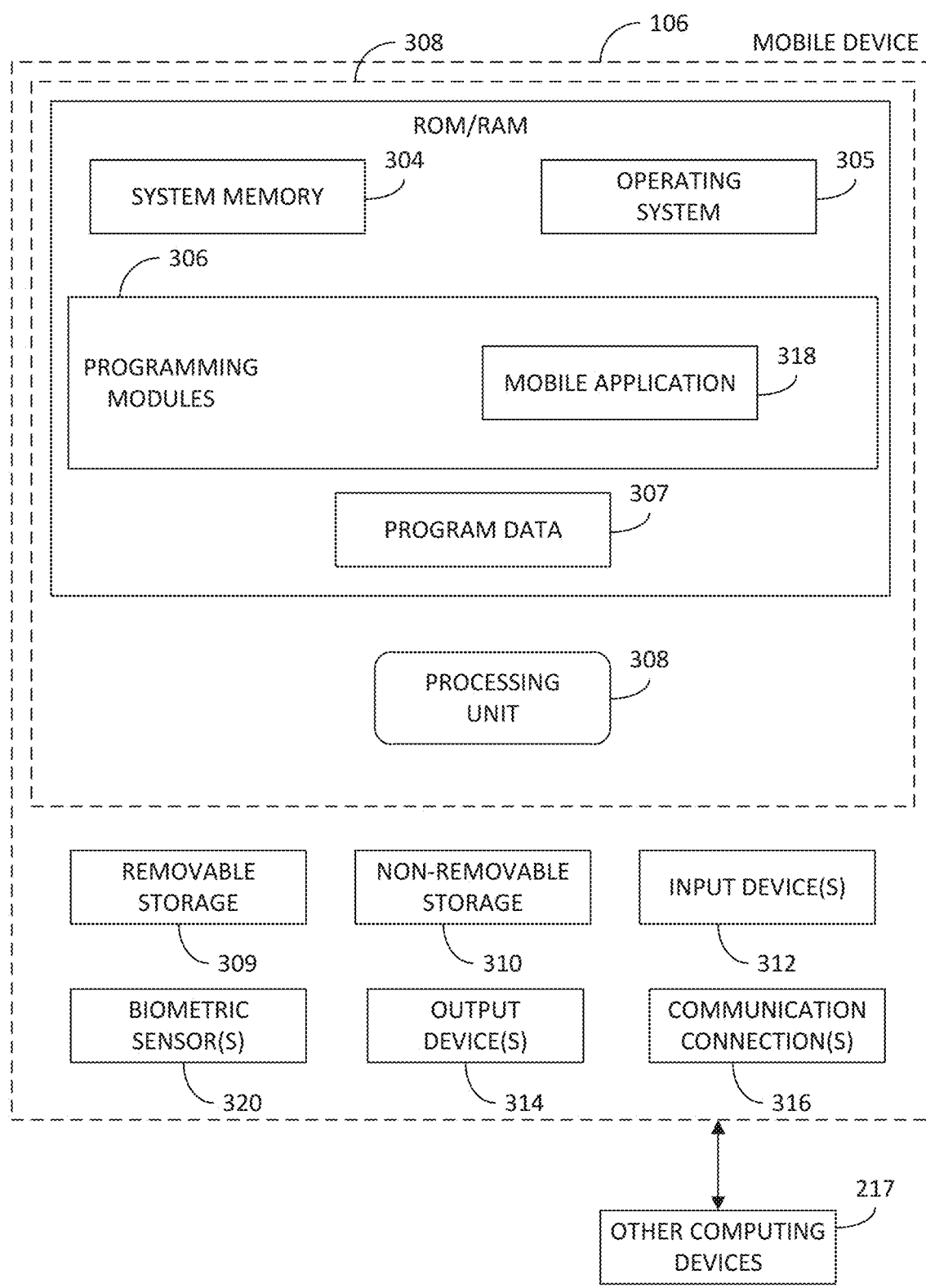

Referring now to FIGS. 2A and 2B, exemplary functional blocks representing the software and hardware components of computing device 110 and personal device 106 are illustrated. As is shown in FIG. 2A, computing device 110 may include processing unit 202 and system memory 204. Processing unit 202 may be any processor configured to run application 220 and perform the tasks and operations of computing device 110 set forth herein. System memory 204 may comprise, but is not limited to, volatile (e.g. random-access memory (RAM)), non-volatile (e.g. read-only memory (ROM)), flash memory, or any combination thereof. Operating system 205 and one or more programming modules 206 as well program data 207 may be run on computing device 110. Operating system 205 may be suitable for controlling computing device 110's operation. Programming modules 206 may optionally include image processing module, machine learning module and/or image classifying module. It is understood that computing device 110 may be practiced in conjunction with a graphics library, other operating systems, or any other application program.

Computing device 110 may have additional features and functionality. For example, computing device 110 may also include additional data storage devices (removable and/or non-removable) such as, for example, magnetic disks, optical disks, or tape. Such additional storage is illustrated in FIG. 2A by a removable storage 209 and a non-removable storage 210. Computer storage media may include volatile and nonvolatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store information and which may be accessed by computing device 110. Any such computer storage media may be part of computing device 110. Computing device 110 may also have input device(s) 212 such as a keyboard, a mouse, a pen, a sound input device, a touch input device (e.g., touch pad or touch screen), a location sensor, a camera, etc. Output device(s) 214 such as a display, speakers, a printer, etc. may also be included. Output device 214 may display a user interface.

Computing device 110 may also contain communication connection 216 that may allow computing device 110 to communicate with personal device 106, server 102 and any other computing devices 217 within or in communication with authentication system 100 over any well-known wired or wireless connection, and (e.g., cellular, Near Field Communication (NFC), Wi-Fi Direct (P2P), Bluetooth, USB, radio frequency (RF and RFID), infrared, etc.) including over any well-known standard such as any IEEE 802 standard. Communication connection 216 may be embodied or otherwise facilitated by computer readable instructions, data structures, program modules, or other data in a modulated data signal. The term "modulated data signal" may describe a signal that has one or more characteristics set or changed in such a manner as to encode information in the signal.

As stated above, a number of program modules and data files may be stored in system memory 204, including operating system 205. While executing on processing unit 202, application 220 and/or programming modules 206 may perform processes including, for example, one or more stages of methods, algorithms, systems, applications, servers, databases as described herein. For example, programming modules 206 and/or application 220 permits computing device 110 to interface with personal device 106 running mobile application 318 and server 102, as described in more detail below with respect to FIG. 3. Application 220 may be a browser extension (i.e., web browser plug-in) that extends the functionality of a web browser to include the authentication functionality described in more detail below. Alternatively, application 220 may be an extension on the back-end of a website (e.g., website generated by www.wordpress.com) and hosted on server 102 or a different server. In other configurations, application 220 may be embodied as, for example, but not be limited to, a website, a web application, a desktop application, and/or a mobile application compatible.

Other programming modules that may be used in accordance with embodiments of the present disclosure may include sound encoding/decoding applications, machine learning application, encryption/decryption applications, acoustic classifiers etc. Generally, program modules may include routines, programs, components, data structures, and other types of structures that may perform particular tasks or that may implement particular abstract data types. It of course is understood that computing device 110 may include additional or fewer components than those illustrated in FIG. 2A and may include more than one of each type of component.

Referring now to FIG. 2B, exemplary functional blocks of personal device 106 are shown. As is shown in FIG. 2B, personal device 106 may include processing unit 302 and system memory 304. Processing unit 302 may be any processor configured to run mobile application 318 and perform the tasks and operations set forth herein with respect to personal device 106. System memory 304 may comprise, but is not limited to, volatile (e.g. random-access memory (RAM)), non-volatile (e.g. read-only memory (ROM)), flash memory, or any combination.

Operating system 305 and one or more programming modules 306 as well as program data 307 may be run on computing device 110. Operating system 305 may be suitable for controlling the operation of personal device 106. Programming modules 306 may optionally include image processing module, machine learning module and/or image classifying module. It is understood that personal device 106 may be practiced in conjunction with a graphics library, other operating systems, or any other application program.

Personal device 106 may have additional features and functionality. For example, personal device 106 may also include additional data storage devices (removable and/or non-removable). Such additional storage is illustrated in FIG. 2B by a removable storage 309 and a non-removable storage 310. Personal device 106 may include volatile and nonvolatile, removable and non-removable media implemented in any method or technology for storage of information, such as computer-readable instructions, data structures, program modules, or other data. System memory 304, removable storage 309, and non-removable storage 310 are all computer storage media examples (i.e., memory storage.)

Personal device 106 may also have input device(s) 312 such as a keyboard, a mouse, a pen, a sound input device, a touch input device, a location sensor, a camera, etc., as well as output device(s) 314 such as a display, speakers, etc., for example. Personal device 106 further includes biometric sensor 320 which may be one or more biometric sensors each configured to obtain biometric data of the user. Biometric sensor may be, for example, a camera, a finger print scanner, a retina scanner, a microphone, an infrared camera, thermal imaging camera, or any other sensor or input device suitable for biometric measurements. Biometric sensor(s) 320 may be a combination of hardware and software built into personal device 106 and executed on processing unit 302. Biometric sensor 320 may employ, for example, one more of the following: well-known retina scan functionality that may involve analyzing an image of the blood vessel pattern in the light-sensitive surface lining the individual's inner eye; well-known iris pattern identification functionality that may involve analyzing a unique pattern within the ring-shaped region surrounding the pupil of the eye; well-known finger print identification functionality that may involve identifying a pattern of raised areas and branches in an image of a human finger; well-known finger vein identification functionality that may involve identifying a unique vascular pattern in an individual's finger; well-known face scan technology that may involve analyzing multiple nodal points on a human face and; well-known voice recognition functionality that may involve the identification of one or more of voice pitch, tone, inflection and/or speaking style and may rely on characteristics created by the shape of the speaker's mouth and throat.

Personal device 106 may also contain communication connection 316 that may allow personal device 106 to communicate with computing device 110, server 102 and any other computing devices 217 over any well-known wired or wireless connections. Communication connection 316 may be embodied or otherwise facilitated by computer readable instructions, data structures, program modules, or other data in a modulated data signal.

As stated above, a number of program modules and data files may be stored in system memory 304, including operating system 305. While executing on processing unit 302, programming modules 306 may perform processes including, for example, one or more stages of methods, algorithms, systems, applications, servers, databases as described herein. For example, programming modules 306 includes mobile application 318 that performs authentication functionality executed on personal device 106 and described herein. Other programming modules that may be used in accordance with embodiments of the present disclosure may include encoding/decoding applications, for example. It, of course, is understood that personal device 106 may include additional or fewer components than those illustrated in FIG. 2B and may include more than one of each type of component.

Figure 3A:
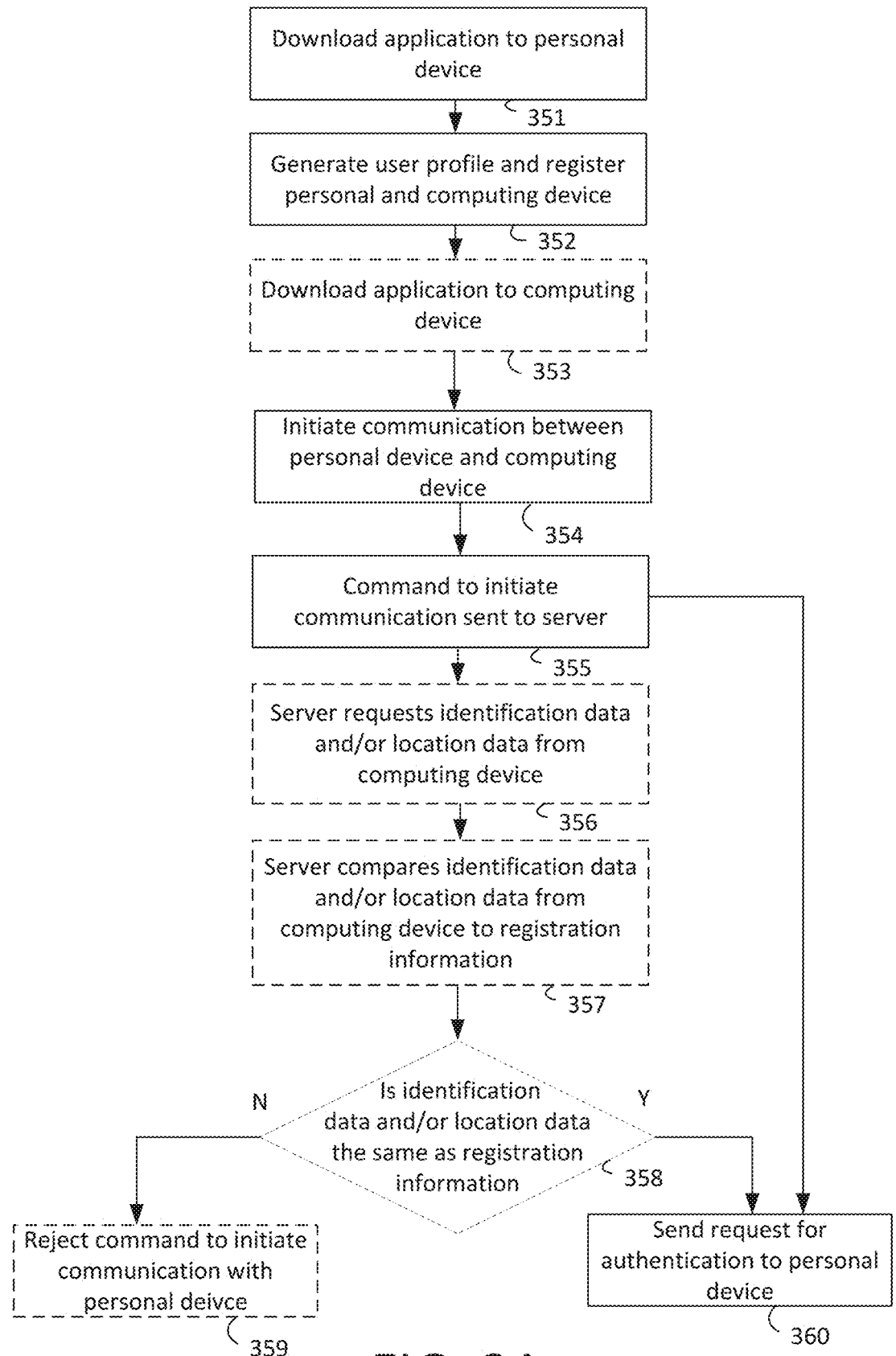
FIGS. 3A-3D are flow charts illustrating embodiments of the operations and decisions made in implementing the authentication system for granting access to digital content.

Referring now to FIG. 3A, a flowchart is illustrated detailing the data flow and decisions made in implementing authentication system 100. As mentioned above, authentication system 100 may be used to authenticate a user using personal device 106. Upon authenticating a user on personal device 106 using biometric data, personal device 106 will provide certain credentials to application 220 to grant the user access to a web browser, a web portal or other software systems. It is understood that the process set forth in FIG. 3 applies whether application 220 is installed on the computing device, a browser extension, and/or incorporated into the backend of a website.

To initiate the process set forth in FIG. 3A, at step 351 the user downloads mobile application 318 on personal device 106. The user may download mobile application 318 from the Internet. For example, the user using personal device 106 may access the Apple or Google application store over the Internet, or any other website or application that provides access to downloadable applications. Mobile application 318 may then be installed on personal device 106.

Upon downloading mobile application 318 on personal device 106, at step 352 the user may register and generate a user profile using mobile application 318. The registration process may require the user to provide user identification information. Alternatively, the mobile application 318 may automatically retrieve user identification information from personal device 106. The user identification information may be the phone number associated with personal device 106 of the user or a different alphanumeric identifier of the user and unique to the user. Yet further, the user identification information may be any other unique identifier which may be linked to the phone number associated with the personal device 106 of the user or other unique identifier (such as Media Access Control (MAC) address) associated with personal device 106 of the user. For example, the User ID may be a mobile identification number (MIN), mobile subscription identification number (MSIN), Electronic Serial Number (ESN), Mobile Equipment Identifier (MEID), International Mobile Equipment Identity (IMEI), and/or international mobile subscriber identity (IMSI), or any other identifier unique to personal device 106. The user profile may include at least the user identification information and may additionally include information about the user and/or the personal device and/or any other user information. The user profile may be saved on server 102 as well as computing device 110, personal device 106 and/or database(s) 114.

Authentication system 100 may optionally require the user to confirm that the user is in possession of the personal device corresponding to the user identification information. For example, upon receiving the user identification information, the server may send a verification message having a verification code, such as a SMS verification message, to the personal device corresponding to the user identification information. Upon receiving the verification message, the user using the mobile application may transmit the verification code to the server and the server may confirm that the code is correct. It is understood that the verification message may include a link that the user may click to automatically send the verification code to the server. It is understood that the server may coordinate with a third party verification service to verify that the user in the possession of the personal device corresponding to the user identification information. For example, the server may instruct a third party server to send the SMS verification message to the personal device and confirm that the code received from the personal device is correct. Upon performing this verification procedure, the third party server may inform the server that the personal device has been verified. Authentication system 100 may only require a user to verify a personal device once during registration or, alternatively, may require verification each time the user identification information is provided to the server.

Further, the registration process may require the user to generate authentication data unique to the user. Authentication data may include conventional passwords, including a one-time password (OTP), tokens or SMS text (e.g., numbers/code), and/or biometric data such as retina scan information, iris pattern information, finger print scan information, finger vein scan information, face scan information, voice pattern information.

For example, upon downloading mobile application 318 to personal device 106, mobile application 318 may instruct the user to select one or more authentication methods and/or may prompt the user to generate authentication data using one or more biometric sensors 320 according to preprogrammed and preselected authentication methods. In this example, mobile application 318 may prompt the user to place their thumb on a first biosensor which may be a thumbprint scanner. Next, mobile application 318 may prompt the user to take a picture of their eye using a second biosensor that is a camera.

The authentication data will be saved locally by personal device 106. The authentication data may be stored in an encrypted format on personal device 106 to protect the user's privacy. As user authentication is performed by personal device 106, the authentication data need not be communicated to any other device. However, in some configurations, the authentication data may be shared with and saved on the remote server.

Further, the user profile may further include an identifier for computing device 110 and/or a default location for computing device 110 (i.e., computing device identifier). Examples of identifiers of computing device 110 include, but are not limited to, a MAC address, MIN, MSIN, ESN, MEID, MEI, and/or IMSI, or any other identifier unique to computing device 110. The user may manually input the identifier and/or default location for computing device 110 or, alternatively, application 220 may automatically retrieve and populate user profile with identification information and/or default location. The default location may be an address, GPS coordinates, or any other location identifier. The designated location may be the location that a user typically uses computing device 110. The user may select the designated location to be a location that computing device 110 is currently in when the user is registering personal device 106.

The registration process may include collecting user credentials for each website or application that the user intends to access using authentication system 100. For example, mobile application 318 may prompt the user to provide user credentials (e.g., user name or information, password information, and any other information required for access to that website) for websites and/or applications, referred to as credential data. Credential data may be stored in an encrypted format on computing device 110. Alternatively, or in addition to, the credential data may be shared with and stored in an encrypted format on server 102, database 114 and/or personal device 106. Application 220 may retrieve and copy credential data that has been saved locally on computing device 110.

Personal device 106 may copy credential data for one or more websites or applications saved on computing device 110. Personal device 106 may copy the credentials upon receiving an instruction from the user using application 318 or application 220 to copy the credentials from computing device 110. Personal device 106 may store credential data for any number of websites and/or applications.

In some instances, authentication data and/or user profile data may already be present on personal device 106 and/or computing device 110. The authentication data may be stored in locally on these devices and may be associated with another application (e.g., a third party application). For example, biometric data (e.g., thumbprint scan) may be saved on personal device 106 and associated with a third party application. Mobile application 318 may scan personal device 106 for this data and may copy or extract the relevant data. Mobile application 318 may copy or extract the relevant data to the user profile. Application 220, may present the user with an option to extract or copy the authentication data and/or user profile data from computing device 110 and/or personal device 106.

Personal device 106 and/or computing device 110 may transmit the authentication data and/or user profile data to server 102 to be stored and may also transmit such data between one another to be stored on the receiving device. Server 102 may receive and store the authentication data and/or user profile data and any other data relating to the user.

To permit personal device 106 to communicate with computing device 110, at step 353 the user must also download application 220 to computing device 110. The user may access the application 220 via a website or application store (e.g., Apple or Google app store) as discussed above. In some cases, application 220 automatically downloads (i.e., without user intervention) to computing device 110 when computing device 110 accesses a website.

Alternatively, in some cases, application 220 may be an extension on the backend of a website (e.g., website generated by www.wordpress.com) and may be hosted on server 102 or a different server. Where application 220 is an extension on the backend of a website, the user need not download application 220 to computing device 110 and step 353 may be skipped. In another example, application 220 may be pre-installed on computing device 110. Also, step 353 may occur before, after, or simultaneously with step 351 and/or 352.

To employ authentication system 100, at step 354, communication between mobile application 318 and application 220 may be initiated. As explained above, personal device 106 and computing device 110 may communicate with one another via well-known short range communication methods such as Near Field Communication (NFC), Bluetooth, and Wi-Fi Direct (P2P) for example. Alternatively, personal device 106 and computing device 110 and/or server 102 may communicate using other well-known communication methods. For example, personal device 106 and computing device 110 may each be Wi-Fi compatible and may communicate with one another over the Internet.

Communication between mobile application 318 and application 220 may be initiated, for example, by clicking on an initiation icon on an altered browser generated by application 220. Upon clicking on the initiation icon, the browser may prompt the user to enter user identification information into computing device 110 such as the phone number corresponding to personal device 106. Alternatively, the user may use the mobile application 318 to send user identification information from personal device 106 to computing device 110. Computing device 110, running application 220, may share the user identification information with server 102. In some cases, initiation may automatically occur with a default or preselected personal device upon the user opening or accessing a website or application.

At step 355, application 220 via computing device 110 may send a command to initiate communication with personal device 106 to server 102. Where computing device 110 stores user profiles or at least user identification information, application 220 may confirm that the mobile number or other user identification information provided by the user corresponds to user identification information for a registered user prior to sending request. In response to the command, at step 360 the server may relay the request for authentication to personal device 106. In another example, computing device may send the request for authentication to personal device 106 immediately in response to communication being initiated.

Alternatively, prior to sending the authentication request to personal device 106, at step 356, server 102 may request identification data and/or location data from computing device 110. As described above, the identification data may be data unique to computing device 110. Computing device 110 may receive the request and transmit an identifier (e.g., a MAC address, MIN, MSIN, ESN, MEID, IMEI, and/or IMSI, or any other identifier unique to personal device 106) identifying computing device 110. Server 102 may also, or alternatively, request and computing device 110 may provide in response location data indicating where computing device 110 currently is located (e.g., GPS data). At step 357, server 102 may receive the identifier and location data and compare the identifier and location data to the identifier and location data the user provided during the registration process.

At decision 358, server 102 may confirm that the identification data and/or location data provided from computing device 110 matches identification data and/or location data provided by the user during registration. Server 102 may communicate with database 114 and/or personal device 106 to make this confirmation. If server 102 determines that the identification data and/or location data received from computing device 110 is the same as the identification data and/or location data the user provided during the registration process, server 102 may send the request for authentication to personal device 106 at step 360. Personal device 106 may be the device corresponding to the phone number or other identifier entered at step 354 or may be the primary personal device registered by the user during registration. If server 102 determines at decision 358 that the location data and/or the identification information does not match the data obtained during registration, server 102 may reject the command to initiate a communication between personal device 106 and computing device 110.

Where application 220 is an extension on the back end of the website, at step 354 the user may initiate communication between personal device 106 and computing device 110 by accessing the website via computing device 110. For example, upon opening the website, the website will prompt the user to enter a user name and password. Upon verifying that the user name and password are correct (e.g., by comparing the user name and password to a database on a remote server), the website will prompt the user to enter a phone number or other user identification information. Alternatively, upon visiting the website on computing device 110, the website may prompt the user to enter the user identification information. As is the case with the system involving the browser extension, the user identification information provided to the website may be shared with server 102. Server 102 and/or database(s) 114 may confirm that the mobile number or other user identification information provided corresponds to user identification information of a registered user.

Figure 3B:
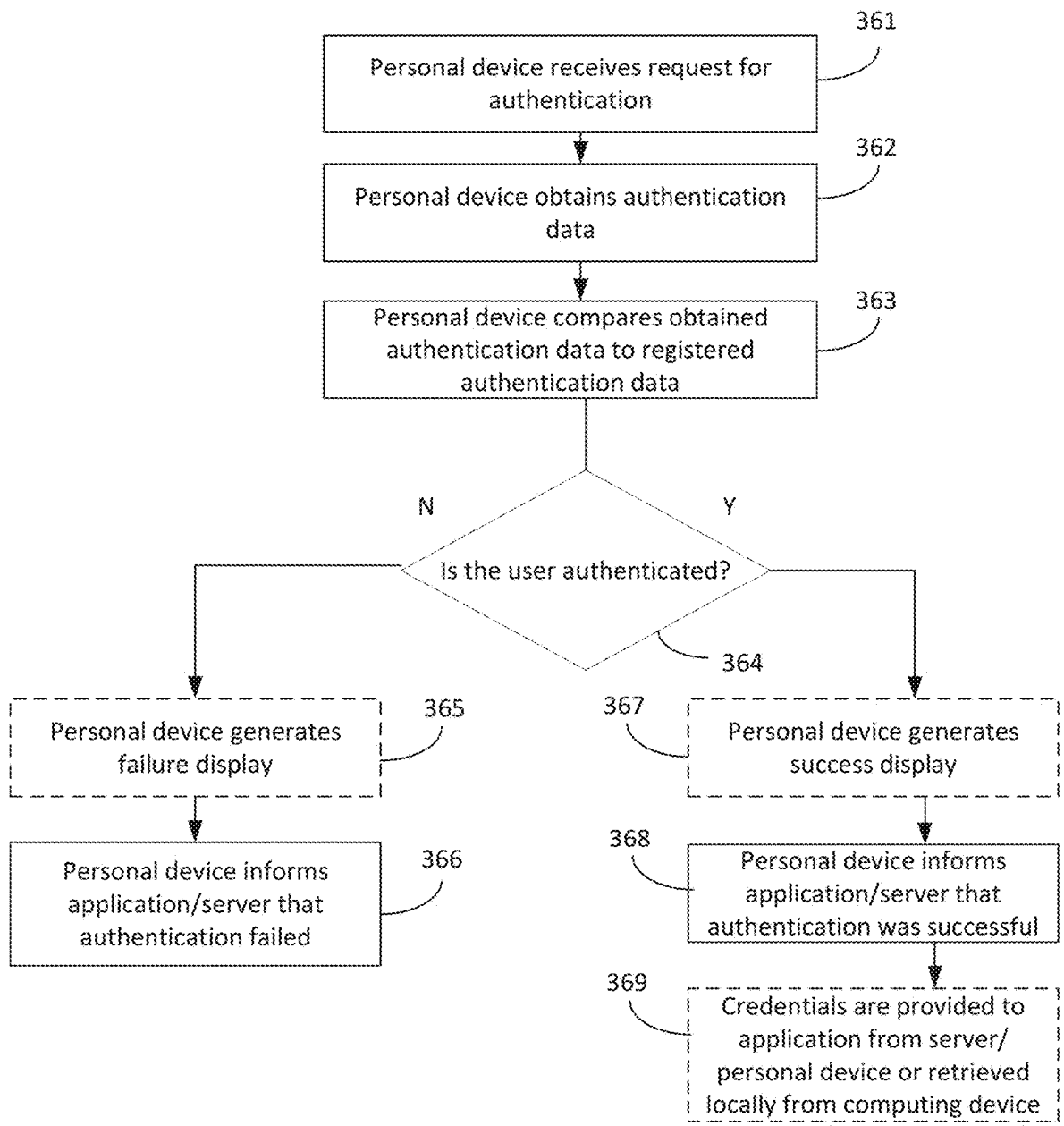

Referring now to FIG. 3B, a flowchart is illustrated detailing the data flow and decisions made in implementing authentication system 100 to authenticate a user via personal device 106. At step 361, personal device 106 may receive the request for authentication from server 102 or computing device 110. At step 362 personal device 106 running mobile application 318 will obtain authentication data. Mobile application 318 may be programmed to require a certain authentication data (e.g., password, fingerprint data, retina data, iris data, face data, voice data) to authenticate the user. Mobile application 318 may be programmed to have a bias for certain authentication methods according to a programmed hierarchy and may further be programmed to require a certain number of authentication methods. For example, mobile application 318 may be programmed to have a two-step authentication process involving authentication via thumb print and face recognition. In this example, mobile application 318 may first prompt the user to place his or her thumb on biometric sensor 320, which in this example is a fingerprint scanner, to obtain fingerprint data. Next, mobile application 318 will prompt the user to obtain an image of his or her face using a second biosensor, which in this example is a camera, to obtain face data.

At step 363, personal device 106 running mobile application 318 may analyze authentication data using for example, well known fingerprint analysis, retina analysis, iris analysis, face analysis and voice analysis techniques. The data collected and/or the analyzed data will be compared to the authentication data corresponding to a user's profile and stored locally on personal device 106. At decision 364, after comparing the data obtained at step 362 to the authentication data corresponding to the user's profile, personal device 106 running mobile application 318 will determine whether the obtained data is the same or substantially similar to the authentication obtained during the registration process, and thus if the user has been authenticated. The degree to which the data must be similar may be set and altered by an administrator.

If personal device 106 running mobile application 318 determines at decision 364 that the user is not authenticated (i.e., authentication data obtained at step 362 is not the same or substantially similar to authentication data obtained during registration), at step 365 personal device 106 may optionally generate a message on the display of personal device 106 that the authentication failed. Personal device may repeat steps 361-363 a preset number of times or may even prompt the user to generate different biometric data (e.g., iris pattern scan) if the first attempt to authenticate failed. Further, at step 366 personal device 106 running mobile application 318 may inform computing device 110 running application 220 and/or server 102 that authentication failed. Application 220 may also generate a message on the display of the computing device informing the user that authentication failed.

Conversely, if personal device 106 running mobile application 318 determines at decision 364 that the user is authenticated, at step 367, personal device 106 may optionally generate a message on the display of personal device 106 that the authentication was successful. Further, at step 368, personal device 106 will inform application 220 and/or server 102 that the authentication was successful.

At step 369, in response to a successful authentication, personal device 106 and/or server 102 may communicate credentials to computing device 110 running application 220. The credentials may be communicated to application 220 via any of the well-known communication methods set forth above and may be transmitted in an encrypted format. The credentials will be specific to the website for which communication was initiated in step 364. Alternatively, where computing device 110 has been provided and stores the credential information, computing device 110 may provide the credential information.

In one example, computing device 110 may include a password manager module which may be a part of application 220 or may be a standalone software application run on computing device 110. A user may save passwords and various information, such as user names, using password manager module. This information may be saved locally on application 220 or may be saved on a remote server (e.g., server 102) and retrieved by application 220. Upon being informed that authentication was successful, application 220 may communicate with the password manager module to obtain certain credentials. Specifically, application 220 may generate a request for credential information from password manager module and/or transmit the request to password manager module. Upon receiving the request, password manager module may retrieve the requested credential information, either locally or from the remote server, and generate and/or transmit the requested credential information.

Application 220, upon receiving the credentials, may auto-populate the credentials into the corresponding fields and may automatically submit the credentials. Alternatively, application 220 may display the credentials on computing device 110 and the user may cut and paste or otherwise place the credentials into the appropriate location on the graphic user interface and manually submit the credentials. In this manner, the user using personal device 106 may perform authentication on personal device 106 to access the website on computing device 110.

In one example, server 102 may be a manager server managed by a company administrator using an administrator device. The manager server may be employed where a company seeks to limit and control access (e.g., employee access) to a company website or web portal. The manager server may run inside the enterprise network, on the cloud and/or a Blockchain based platform. It is understood that the manager server may also be used to control access to and otherwise manage authentication system 400, described below.

The manager server may maintain and manage user profile information including user identification information and even credential information relevant to that website or web portal. Administrators with access to manager server may oversee the manager server and set and alter user profile information, user identification, authorization information, registration information, and/or credential information. For example, the administrator may add or delete user profiles, limiting access to the website or web portal, and may determine how often the credentials for the website or web portal must be changed. The administrator may set the credential information for each user and the individual users (such as employees) may not be allowed to view the credentials information (passwords) though they may be only allowed to use (copy and paste) the passwords and/or auto-fill the passwords. Manager server may be controlled by a software installed on the manager server that interfaces with software on an administrator device. In one example, the manager server may include or may interface with a policy server programmed to dynamically change the credential information. The manager server and/or policy server may change the credential information necessary for access to the company system after a set period of time (e.g., every five minutes). The manager server and/or policy server may also change company policies related to the credential information (e.g., may modify the set period of time for changing passwords).

As explained above, communication between the personal device and the computing device may be initiated and the user identification information may be requested. The user identification information will be communicated to the manager server to confirm that the user has been registered. Alternatively, if the user's computing device is within the corporate network (e.g., not accessing the website or web portal remotely) the user's computing device and manager server may interact directly via local network (such as Ethernet or Wi-Fi) and automatically confirm identification.

After confirming that the user has been registered, the manager server may send a request to the personal device to authenticate the user. As explained above, the user may provide the required authentication data (such as face print, finger print, iris pattern, voice pattern) on the user's computing device (i.e., personal device 106). Thereafter, the user's computing device may inform the manager server of whether the authentication was successful. If authentication was successful, then the password manager server sends the corresponding credentials (e.g., to the browser running the website or web portal to provide access to the corresponding website or web portal).

Further, a company (or employer) may also set access privileges. For example, if an employee leaves the company, the administrators may revoke access of the employee by deleting the user profile corresponding to that employee or otherwise altering the user profile to prevent access. Further, the manager server may track access by employees or other users. Also, manager server may limit access to certain information within website or web portal. For example, for more sensitive data, the company may allow access only to employees that have a certain security clearance. The manager server may also track the user devices that have installed the mobile application. The company may restrict access to the mobile application to only work phones and work computers. Using the administrator device, the administrators may also detect any suspicious devices accessing the manager server.

Figure 3C:
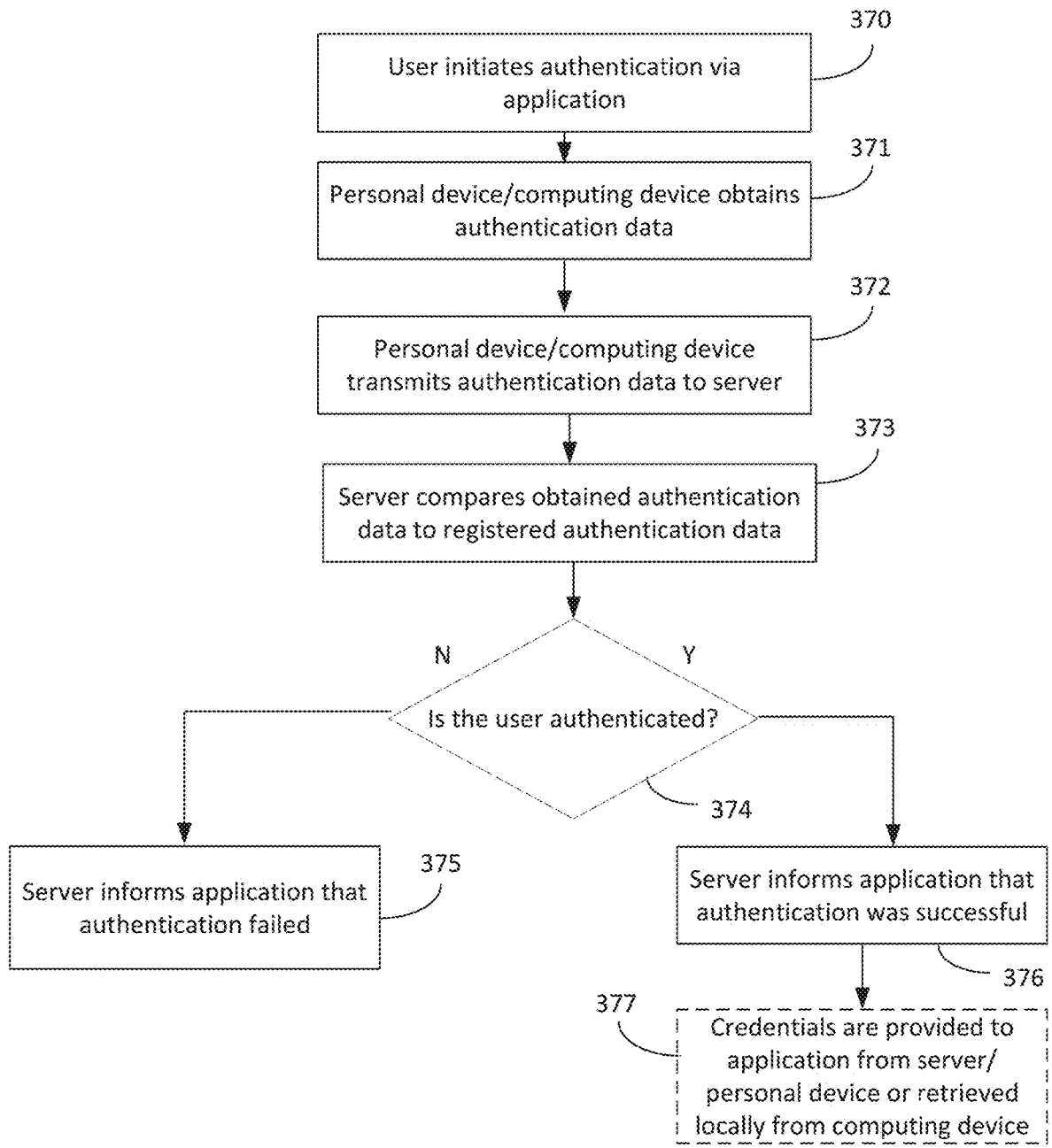

Referring now to FIG. 3C, a flowchart is illustrated detailing the data flow and decisions made in implementing authentication system 100 to authenticate a user via server 102. FIG. 3C starts after application 220 has been downloaded to computing device 110 and mobile application 318 has been downloaded to personal device 106, as described in steps 351-352 of FIG. 3A. At step 370, a user may initiate authentication. For example, a user may initiate the authentication via a user interface on personal device 106 or computing device 110.

At step 371, personal device 106 or computing device 110 may obtain authentication data. Computing device 110 may include components to collect authentication data similar to the components of personal device 106 (e.g., a retina scanner, a thumbprint scanner, a camera, etc.). Personal device 106 or computing device 110 may obtain the authentication data in a process similar to the process personal device 106 uses to obtain authentication data in step 362. At step 372, computing device 110 or personal device 106 may transmit the obtained authentication data to server 102. Where both computing device 110 and personal device 106 are capable of generating authentication data, computing device 110 may operate as a back-up system to personal device 106.

At step 373, server 102 may compare the obtained authentication data to registered authentication data. The user profile and data generated during registration may be saved on server 102 or database 114. At decision 374, server may determine if the user is authenticated. This procedure may be the same as the approach described at decision 364 in FIG. 3B described above. If server 102 determines at decision 374 that the authentication failed (i.e., the generated authentication data does not match or substantially match the registered authentication data), at step 375, server 102 may inform application 220 and/or mobile application 318 that authentication failed. Conversely, if server 102 determines that authentication was successful (i.e., the generated authentication data matches or substantially matches the registered authentication data), at step 376, server 102 may inform application 220 or 318 that authentication was successful.

At step 377, after the user has been authenticated, server 102 or personal device 106 may provide credentials (e.g., user name and password information) to computing device 110 or, alternatively, computing device 110 may retrieve the credentials locally. Advantageously, a user may only need to generate authentication data to successfully access a website or application that requires a user name and password as the credentials may be auto-populated upon successful authentication.

Figure 3D:
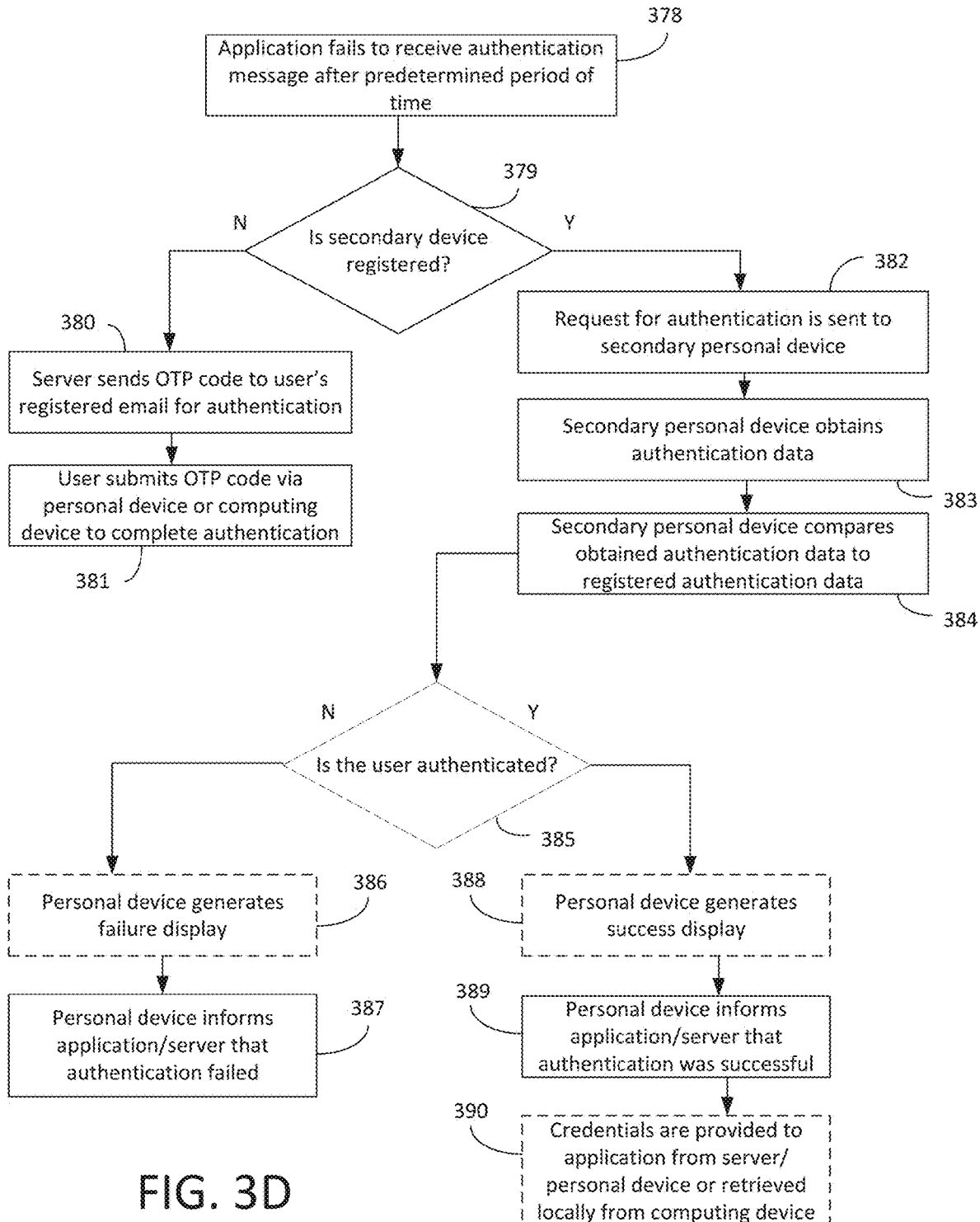

Referring now to FIG. 3D, a flowchart is illustrated detailing the data flow and decisions made in implementing a backup authentication system in authentication system 100. The data flow and decisions shown in FIG. 3D represent an optional process for performing authentication where communication is initiated and a request for authentication is communicated to personal device 106 but, at step 378, a response has not been received by mobile server 102 and/or computing device 110 after a predetermined period of time. The predetermined period of time may begin when computing device 110 or server 102 transmits a request for authentication data to personal device 106. An administrator may determine the predetermined period of time to be any length. The expected response is a message from personal device 106 that authentication succeeded for failed.

At decision 379, server 102 and/or computing device 110 may determine whether a secondary personal device (not shown) is associated with an account of the user based on the user profile or registration data. If server 102 determines that there is not a registered secondary device, at step 380, server 102 may send a one-time password (OTP) code to the registered email of the user for email authentication. At step 381, the user may receive and submit the OTP code via email using personal device 106 or computing device 110 to complete authentication. Advantageously, by using an OTP code for authentication, the user may be authenticated even if the request for authentication sent to application 318 running personal device 106 fails.

If server 102 determines that there is a registered secondary personal device, at step 382, either computing device 110 or server 102 communicates a new request for authentication to secondary personal device. At step 383, the secondary personal device obtains authentication data in the same manner described in step 362. At step 384, the secondary personal device compares obtained authentication data to registered authentication data in the same manner described in step 363. The secondary personal device may have access to registered authentication data from computing device 110, server 102, and/or personal device 106 and may save this data locally. At decision 385, the secondary personal device may determine whether the authentication data is authenticated in the same manner described with respect to decision 364. At step 386, if the user is not authenticated, the secondary personal device may optionally generate a failure display in the same manner described with respect to step 365. At step 387, the secondary device may inform an application or server that authentication failed in the same manner described with respect to step 366. At step 388, if the user is authenticated, the secondary personal device may optionally generate a success display in the same manner described with respect to step 367. At step 389, the secondary personal device may optionally inform application 220 or server 102 that authentication was successful in the same manner described with respect to step 368. At step 390, credentials are provided to the application from the server or secondary personal device or retrieved locally from the computing device in the same manner described with respect to step 369. It is understood that the same approach described above may be used with a secondary device that is not a personal device, such as personal computer, laptop, tablet or any other computing device with features enabling receipt and transmission of authentication data and/or email.

The steps and decisions set forth above with respect to FIGS. 3A-D are applicable to web-based subscription streaming services that play media content (e.g., Netflix, Hulu, HBO Go, etc.). In one example, computing device 110 may be a television that connects to the Internet and permits the user to access the streaming services via a website or web-based application. The user may download a television application to the television and also download a mobile application to the user's personal device (i.e., personal device 106), consistent with steps 351 and 353. The television application may interface with the website or web-based application and facilitate access to the subscription services. Using the application downloaded to the personal device, the user may generate a user profile and register the personal device, as described above with respect to step 352. The user profile will include user identification information (e.g., phone number). The personal device will share the user identification information with the television which will send the user identification information to the remote server. Alternatively, the personal device will send the user identification information directly to the remote server. The user profile will also include a username and password (i.e., credential information) for the streaming services. The personal device will send that credential information to the television, which will save the user name and password on the television.

To access and otherwise use the streaming services, the user using the personal device may initiate communication with the television at step 354 by sending user identification information (e.g., phone number) to the television application unprompted. As explained above, the personal device and the television may connect via well-known short range communication methods such as Bluetooth or Wi-Fi Direct (P2P). Alternatively, the user may prompt the television application (e.g., using a remote control) to send nearby computing devices, or computing devices that the television is in short range communication with, a request for user identification information. Upon receiving the request for user identification information, the mobile application may automatically send user identification information to the television application or may send this information directly to the remote server. In both examples, where the television application receives user identification information, the television application will send this user identification information to the remote server over the internet.

As explained above with respect to steps 354 and 355, the remote server will confirm that the user identification information matches the user identification information saved on the server (i.e., confirm that the personal device is registered) and will send a request for authentication to the personal device. Alternatively, the server may send the request for authentication to the television and the television may send the request for authentication to the personal device. The personal device will then authenticate the user as described above with respect to decision 356. In this example, the mobile application may authenticate the user by scanning the user's thumbprint using a thumbprint scanner on the personal device and comparing the thumbprint to the thumbprint generated during registration.

If the mobile application determines that the user is authenticated (e.g., the obtained fingerprint matches the fingerprint in the user's profile), the personal device will send a message to the television instructing the television that the user has been authenticated. Upon being instructed that the user has been authenticated, the television will retrieve credential information stored on the television to gain access to the streaming services.

It is understood that the personal device used to communicate with computing device 110 in FIGS. 3A-3D, may be a different personal device than the personal device used during the registration process in step 352 described above. It is further understood that a user may select one or more mobile numbers to affiliate a user profile with the personal devices corresponding to one or more mobile numbers. If a different personal device is used to communicate with computing device 110, user identification information may optionally involve information not specific to the personal device used during registration. For example, user identification information may be alphanumeric information unique to the user. Further, where a different personal device is used to communicate with computing device 110, the user profile information saved on server 102 will include authentication data saved in an encrypted format. In this configuration, upon receiving a request for authentication and obtaining authentication data at step 362, the personal device will obtain authentication data and send the obtained authentication data to server 102. As the personal device used to obtain authentication data does not have the authentication data generated during registration saved locally, server 102 will compare the obtained authentication data to the authentication data obtained during registration to authenticate the user. Server 102 will inform application 220 whether the user has been authenticated. Alternatively, server 102 will send the authentication data generated during registration to the personal device and the personal device will authenticate the user and inform application 220 whether the user has been authenticated.

It is further understood that the personal device that initiates communication at step 354 may be a different personal device than the personal device that receives the request for authentication at step 361, obtains authentication data at step 362, compares the obtained authentication data to registered authentication data at step 363, and authenticates the authentication data at decision 364. Specifically, a first personal device used by a first user may initiate communication and cause authentication system 100 to generate a request for authentication data from a second personal device used by a second user. Where two personal devices implement authorization system 100, the second personal device may directly inform the first personal device whether the authentication was successful at decision 364 and/or may communicate with the second personal device via the server. This approach may be useful where the user of the first personal device does not have authority to access certain information or data and needs authorization from a second user to access the information or data. It is understood that both the first and second personal device may be required to register as set forth above, or, alternatively, only the second personal device may be required to register.

The steps and decisions set forth above with respect to FIGS. 3A-3D are applicable to mobile-based ride-share applications (e.g., Uber, LYFT, etc.). In one example, the ride-share applications allow for a passenger to request a ride from a driver via one of the ride-share applications. The passenger may submit, via a personal device, a request to receive a ride from a first location to a second location and the driver may accept the request, via the driver's personal device. The ride-share application may inform the potential passenger of the identity of the potential driver through the application on the personal device of the passenger. In some cases, a driver may loan their personal device to an unauthorized friend of the driver so the friend may drive the passenger and earn money. To avoid this situation mobile application 318 may be employed alongside the ride-share application. Application 318 may interface with the ride-share application to facilitate access to the ride-share application and authenticate the driver using biometric information to confirm the registered driver is using the application. Using the application downloaded to the personal device, the driver may generate a user profile and register the personal device, as described above with respect to step 352. The driver may receive a notification on the personal device indicating a request from a passenger for the driver to give the passenger a ride. Before the driver accepts the ride, application 318 may interface with the with the ride-share app to verify the identity of the driver. In some cases, the request for a ride from a passenger may take the form of a request for authentication. The driver may provide authentication data (e.g., a face scan or a thumbprint scan) to the personal device and the personal device may authenticate the driver in the manner described above with reference to steps 362-369. Alternatively, the personal device may transmit the authentication data to a server to authenticate the driver in the manner described above with reference to steps 371-377. Once the driver is authenticated, application 318 may permit the driver to accept the ride. If the driver is not authenticated, application 318 will not allow the driver to accept the ride.

Figure 4:
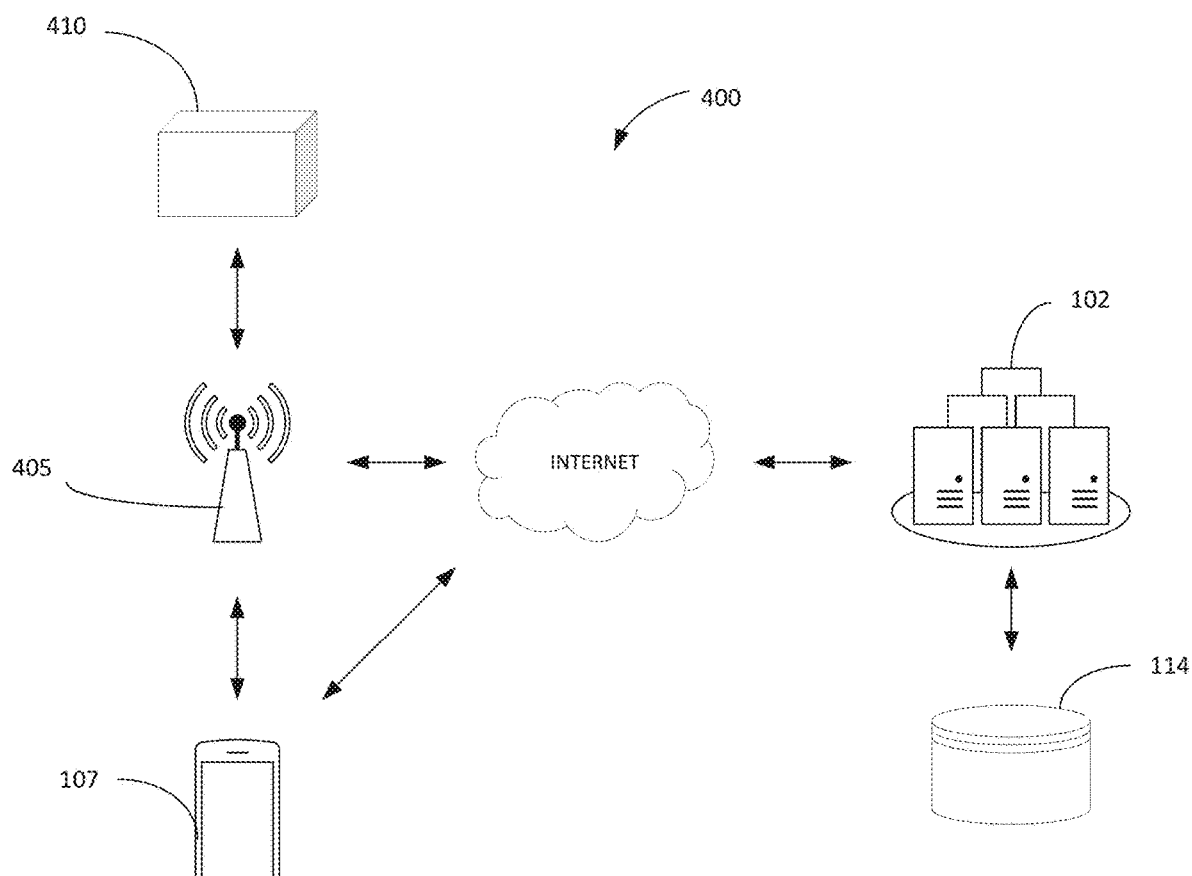
FIG. 4 illustrates an exemplary authentication system for granting access to a computing device or physical location.

Referring now to FIG. 4, authentication system 400 is illustrated. User authentication system 400 is designed to perform user authentication and grant a user access to a digital system or application or a physical location. For example, user authentication system 400 may grant a user using personal device 107 access to a computer device such as a desktop computer or to a physical location such as a building, room, restricted area or object (e.g., building, room, garage, parking lot or even a vehicle or locker).

User authentication system 400 involves personal device 107, interface device 405, secure system 410 server 102 and database 114. Sever(s) 102 and database(s) 114 may be the same personal device, servers and databases described above with respect to authentication system 100 and/or may be a manager server. Personal device 107 is the same as personal device 106 but instead of running mobile application 318, personal device 107 runs mobile application 50 (not shown).

Interface device 405 may be any computing device having processing power, storage, and network connectivity and may optionally include an input device and a display. It is understood that interface device 405 may be a standalone computing device having standalone hardware and software modules or may be incorporated into secure system 410. In one example, interface device 405 may be a computing device having a mechanical button affixed to a portion of secure system 410.

Secure system 410 may be a physical barrier to a physical location such as a door, gate, arm, fence, or any other physical barrier. Secure system 410 may involve electronics and mechanical structure to permit the physical barrier to be locked and unlocked, or opened and/or closed. Alternatively, secure system 410 may be a computing device or even a software system or software application that has a locked configuration and an unlocked configuration. In the locked configuration, information and functionality may not be accessed by the user. Interface device 405 may optionally be incorporated into secure system 410 such that secure system 410 and interface device 405 share at least some hardware and/or software.

Mobile application 50 may be any mobile software application configured to run on personal device 107 and generate a user interface on personal device 107 and programmed to perform the tasks and operations executed on personal device 107 described herein. Interface device 405 is configured to run software application 420. Personal device 107 running mobile application 50 may communicate with software application 420 running on interface device 405 to perform the operations herein and otherwise facilitate user authentication.

Using personal device 107 running mobile application 50, a user may communicate with interface device 405 running software application 420 via any well-known wired or wireless connection. Personal device 107, running mobile application 50, may connect to the Internet using any well-known methods and may communicate with interface device 405 and/or server 102 over the Internet. It is understood that personal device 107 may communicate with computing device 110 and server 102 using different communication technologies or the same communication technologies. It is further understood that, in some cases, personal device 107 may communicate directly with server 102 (e.g., over the Internet).

Figure 5:
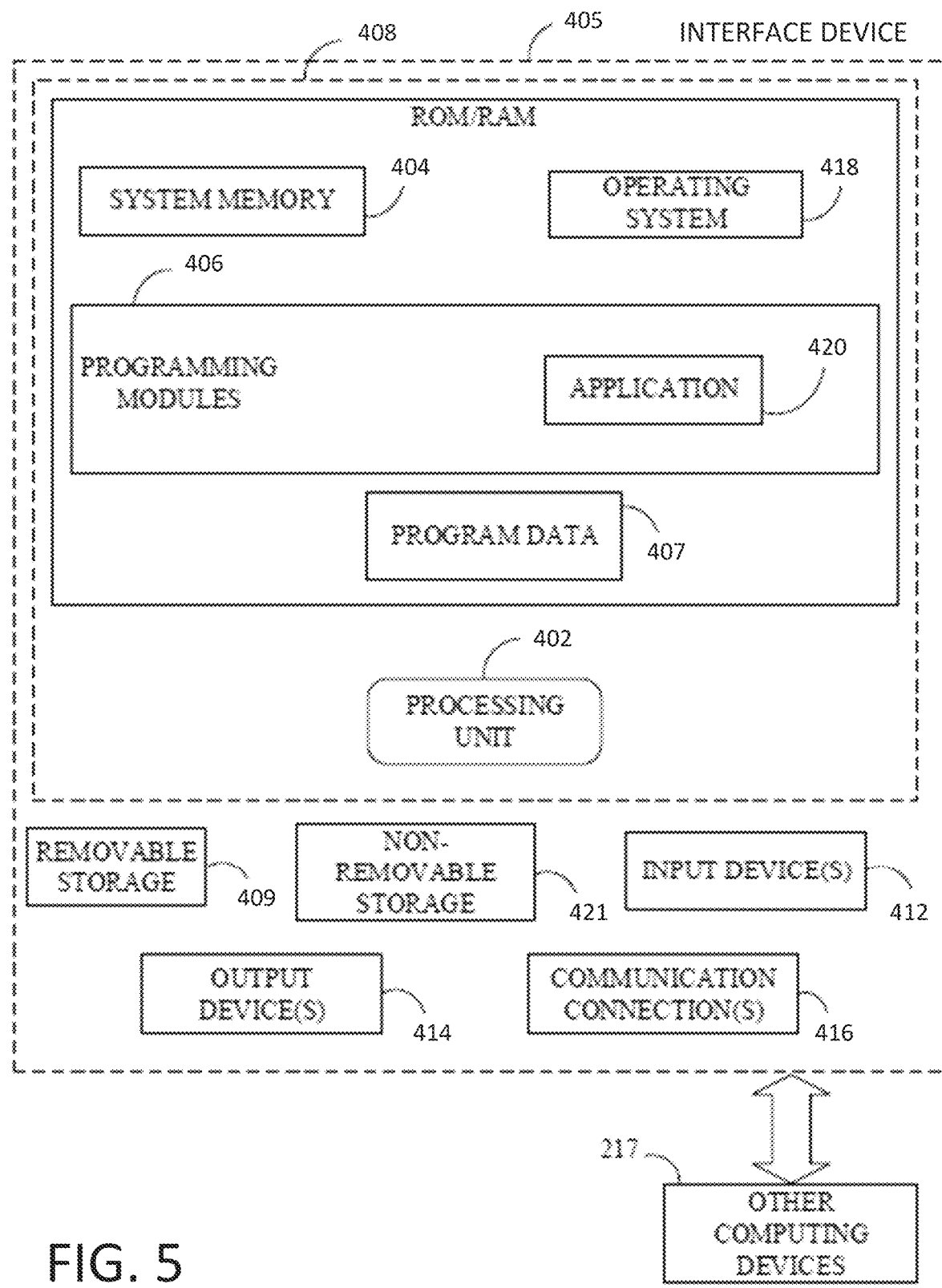
FIG. 5 is a schematic view of exemplary electronic and hardware components of the computing device and the personal device.

Referring now to FIG. 5, exemplary functional blocks representing the software and hardware components of interface device 405 are illustrated. As is shown in FIG. 5, interface device 405 may include processing unit 402 and system memory 404. Processing unit 402 may be any processor configured to run software application 420 and perform the tasks and operations set forth herein. System memory 404 may comprise, but is not limited to, volatile (e.g. random-access memory (RAM)), non-volatile (e.g. read-only memory (ROM)), flash memory, or any combination. Operating system 418 and one or more programming modules 406 as well program data 407 may be run on computing device 110. Operating system 418 may be suitable for controlling the operation of interface device 405. Programming modules 406 may optionally include image processing module, machine learning module and/or image classifying module. It is understood that interface device 405 may be practiced in conjunction with a graphics library, other operating systems, or any other application program.

Interface device 405 may have additional features and functionality. For example, interface device 405 may also include additional data storage devices (removable and/or non-removable) such as, for example, magnetic disks, optical disks, or tape. Such additional storage is illustrated in FIG. 5 by a removable storage 409 and a non-removable storage 421. Computer storage media may include volatile and nonvolatile, removable and non-removable media implemented in any method or technology for storage of information, such as computer-readable instructions, data structures, program modules, or other data. System memory 404, removable storage 409, and non-removable storage 421 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which may be used to store information and which may be accessed by interface device 405. Any such computer storage media may be part of interface device 405. Interface device 405 may also have input device(s) 412 such as a keyboard, a mouse, a pen, a sound input device, a touch input device, a location sensor, a camera, etc. Input device 412 may also be a mechanical button or touch screen button. Output device(s) 414 such as a display, speakers, a printer, etc. may also be included. Output device 414 may display a user interface.

Interface device 405 may also contain communication connection 416 that may allow interface device 405 to communicate with personal device 107, server 102 and any other computing devices 217 over any well-known wired or wireless connection. Communication connection 416 may be embodied or otherwise facilitated by computer readable instructions, data structures, program modules, or other data in a modulated data signal.

As stated above, a number of program modules and data files may be stored in system memory 404, including operating system 418. While executing on processing unit 402, programming modules 406 may perform processes including, for example, one or more stages of methods, algorithms, systems, applications, servers, databases as described herein. For example, programming modules 406 includes software application 420 that permits interface device 405 to interface with personal device 107 running mobile application 50, server 102 and secure system 410, as described in more detail below. Software application 420 may be a stand-alone software application downloaded to and executed on interface device 405 or, alternatively may be hosted on server 102 and accessed via interface device 405. Other programming modules that may be used in accordance with embodiments of the present disclosure may include encoding/decoding applications, machine learning application, acoustic classifiers etc. Generally, program modules may include routines, programs, components, data structures, and other types of structures that may perform particular tasks or that may implement particular abstract data types. It of course is understood that interface device 405 may include additional or fewer components than those illustrated in FIG. 4 and may include more than one of each type of component.

Figure 6A:
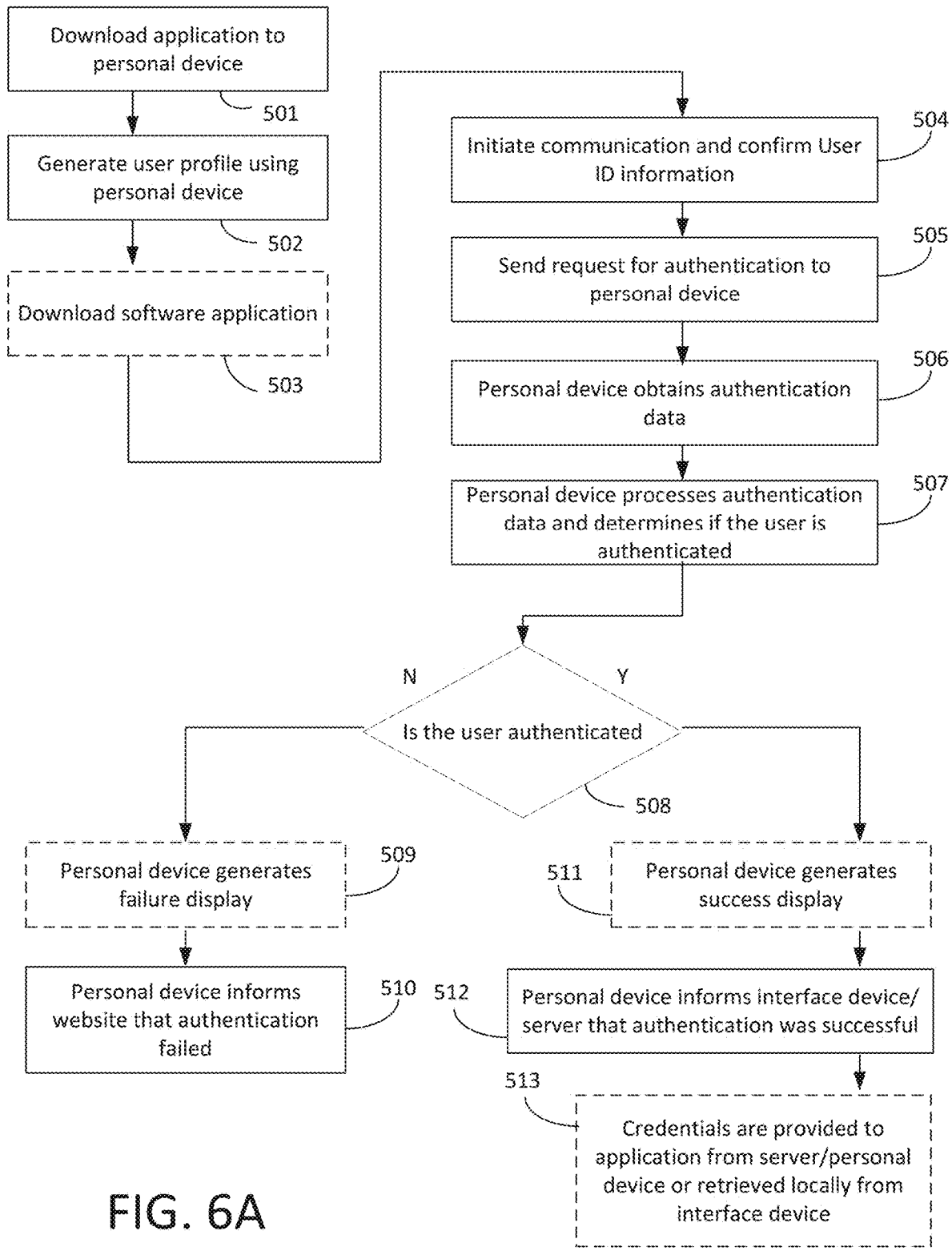
FIG. 6A-6B are flow charts illustrating an embodiment of the operations and decisions made in implementing the authentication system for granting access to a computing device or physical location.

Referring now to FIG. 6A, a flowchart is illustrated detailing the data flow and decisions made in implementing authentication system 400. As mentioned above, authentication system 400 may be used to authenticate a user using personal device 107. If the user is authenticated on personal device 107 using biometric data, personal device 107 will inform software application 420 that the user has been authenticated and software application 420 will communicate and cooperate with secure system 410 to grant the user access to digital content. In some configurations, personal device 107 or server 102 may provide credentials to interface device 405 if necessary for access to secure system 410.

To initiate the process set forth in FIG. 6A, at step 501 the user downloads mobile application 50 on personal device 107. Similar to the process explained above with respect to mobile application 318 the user may download mobile application 50 from the Internet. For example, the user using personal device 107 may access the Apple or Google application store over the Internet, or any other website or application that provides access to downloadable applications. Mobile application 50 may then be installed on personal device 107.

Upon downloading mobile application 50 on personal device 107, at step 502 the user may register using mobile application 50 similar to the registration process described above with respect to mobile application 318. For example, the user may provide user identification information such as a phone number associated with personal device 107 of the user. The user identification information may be any other unique identifier which may be linked to the phone number associated with the personal device 107 of the user (e.g., MAC address, MIN, MSIN, ESN, MEID, IMEI, and/or IMSI, or any other identifier unique to personal device 107). The user identification information and any other the user registration information, referred to as registration data, may be saved on server 102 and/or databases 114.

Authentication system 400, like authentication system 100, may optionally require the user to confirm that the user is in possession of the personal device corresponding to the user identification information and may employ the same procedures for verification as set forth above. For example, upon receiving the user identification information, the server may send a verification message having a verification code, such as a SMS verification message, to the personal device corresponding to the user identification information and upon receiving the verification message, the user using the mobile application may transmit the verification code to the server and the server may confirm that the code is correct. As explained above with respect to authentication system 100, authentication system 400 may only require a user to verify a personal device once during registration or, alternatively, may require verification each time the user identification information is provided to the server.

Further, the registration process may require the user to set up a user profile that includes one or more authentication methods. For example, authentication methods may include conventional passwords, including a one-time password (OTP), tokens or SMS text (e.g., numbers/code), as well as biometric authentication methods already discussed above such as, for example, retina scan, iris pattern identification, finger print identification, finger vein identification, face recognition, voice pattern recognition. Upon downloading mobile application 50 to personal device 107, mobile application 50 will instruct the user to select one or more authentication methods and/or will prompt the user to generate authentication data using one or more biometric sensors 320.

The biometric data and password data (if applicable) collected by personal device 107, referred to as authentication data, will be saved locally personal device 107. The method for collecting and obtaining authentication data is the same as described above with respect to authentication system 100. The authentication data may be stored in an encrypted format on personal device 107 to protect the user's privacy. As user authentication is performed by personal device 107, the authentication data need not be communicated to any other device.

For applications where secure system 410 requires user credentials (e.g., user name and password/pin) for access to secure system 410 the registration process may optionally include collecting user credentials for each secure system 410 that requires credentials for access, referred to as secure system credential data. For example, where secure device is a computing device such as a desktop computer or an Automated Teller Machine (ATM), the user name and password for these systems may be obtained from the user using personal device 107 running mobile application 50. The secure system credential data may be stored in an encrypted format on personal device 107 and/or shared with server 102 and/or databases 114 and stored in an encrypted format on server 102 and/or databases 114.

Some or all authentication data and/or user profile data (e.g., user credentials and other information about the user) of a user may already be present on personal device 107. The authentication data may be stored in memory of personal device 107 and may be associated with another application (e.g., a third party application). Mobile application 318 may scan personal device 107 for this data and may copy or extract the relevant data. Personal device 107 may present the user with an option to extract or copy the authentication data and/or user profile data for registration instead of or in addition to obtaining new authentication data and/or user profile data.

Personal device 107 and/or interface device 405 may transmit the authentication data and/or user profile data to server 102 to be stored. Advantageously, by storing the data on server 102, server 102 may authenticate the data without retrieving the data from other components in authentication system 400 (e.g., personal device 107 or interface device 405.

As mentioned above, personal device 107 running mobile application 50 may communicate with interface device 405 running software application 420. Interface device 405 may be initially designed and programmed with software application 420. Alternatively, at step 503, the user or an administrator with access to interface device 405 may download software application 420 to interface device 405. Where interface device 405 is initially designed and programmed with software application 420, step 503 may be skipped.

To employ authentication system 400, at step 504, communication between personal device 107 running mobile application 50 and interface device 405 running software application 420 may be initiated. Communication may be initiated by, for example, the user pressing or otherwise engage input device 412 which may be a physical button or a button or a screen of interface device 405 that initiates communication. Upon clicking on input device 412, interface device 405 running software application 420 will send personal device 107 running mobile application 50 a message requesting the user to provide user identification information such as the phone number corresponding to personal device 106.

Alternatively, interface device 405 may have a proximity sensor or other sensor for sensing nearby computing devices such as personal device 107. Interface device 405 may be programmed to automatically generate a request for user identification information upon detecting a nearby device. In yet another example, to initiate communication, the user may instruct mobile application 318 to send a user identification information from personal device 107 to interface device 405 unprompted by interface device 405.

The user, using personal device 107, will enter the requested user identification information into personal device 107 which will transmit that information to interface device 405. Alternatively, personal device 107 may be programmed to automatically respond to interface device 405 and provide user identification information stored on personal device 107 or otherwise known to personal device 107. Interface device 405 running software application 420 may share the user identification information with server 102. Server 102 and/or interface device 405 running software application 420 may confirm that the mobile number or other user identification information provided by personal device 107 corresponds to a valid registered user. Server 102 may optionally communicate with database 114 to confirm that the user identification information corresponds to a valid registered user.

Upon initiating communication at step 504, at step 505 software application 420 via interface device 405 or server 102 will send a request for authentication to personal device 107. At step 506, personal device 107 running mobile application 50 will obtain authentication data. Like mobile application 318, mobile application 50 may be programmed to require one or more types of authentication data (e.g., password, fingerprint data, retina data, iris data, face data, voice data) to authenticate the user. Mobile application 50 may be programmed to have a biased for certain authentication methods according to a hierarchy and/or may require a certain number of authentication methods.

In some instances, the initiation of communication between personal device 107 and interface device 405 may fail. The initiation may fail because personal device 107 is not connected to a network to receive a request for authentication data or because personal device 107 may not be working properly, for example. In such instances, interface device 405 may perform steps similar to steps 378-390 to authenticate a user via a secondary device. For example, if interface device 405 fails to receive an authentication response from personal device 107, interface device may determine whether a secondary device is associated with the same user profile as personal device 107 and may use the secondary device to perform authentication, as described in step 378-384. Specifically, if interface device 405 determines there is not a secondary device, interface device 405 may signal for server 102 to send an OTP code to an email of the user for authentication. If there is a secondary device registered, a request for authentication may be sent to the secondary device on which authentication data may be obtained. The secondary device may then determine if the user is authenticated as described in steps 385-390.

The secondary device may be a mobile phone, personal computer, laptop, tablet or any other computing device with features enabling receipt and transmission of authentication data and/or email. The user may download mobile application 318 to the secondary device and register the secondary device. In one example, the user may register the phone number of the secondary device. A user may enter the URL into interface device 405 and enter the secondary device phone number. Upon entering the URL and phone number, application 420 may transmit a request to server 102. Server 102 may compare the phone number received against registered phone numbers. If the received number matches the stored number, server 102 may send a message to the secondary device asking for authentication data (e.g., a face scan or a thumbprint scan). A user using secondary device may generate authentication data and send the authentication data to server 102. Server 102 may compare the authentication data with data stored in server 102. If the received authentication data matches the authentication data stored within server 102, server 102 may send a message to interface device 405 indicating the user is authenticated.

At step 507, personal device 107 running mobile application 50 may analyze authentication data using, for example, well known fingerprint analysis, retina analysis, iris analysis, face analysis and voice analysis techniques. The data collected and/or the analyzed data will be compared to the authentication data corresponding to the user's profile and stored locally on personal device 107. At decision 508, after comparing the data obtained at step 506 to the authentication data corresponding to the user's profile, personal device 107 running mobile application 50 will determine whether the obtained data is the same or substantially similar to the data corresponding to the user's profile, and thus if the user has been authenticated.

If personal device 107 running mobile application 318 determines at decision 508 that the user is not authenticated, at step 509 personal device 107 may optionally generate a message on the display of personal device 107 that the authentication failed. Personal device may repeat step 506 and step 507 a preset number of times or may even prompt the user to generate different biometric data if the first attempt to authenticate failed. Further, at step 510 personal device 107 running mobile application 50 may inform software application 420 and/or server 102 that authentication failed. Software application 420 may also generate a message on the display of the interface device 405, if interface device 405 includes a display, informing the user that authentication failed.

Conversely, if personal device 107 running mobile application 50 determines at decision 508 that the user is authenticated (i.e., authentication was successful), at step 511 personal device 106 may optionally generate a message on the display of personal device 107 that the authentication was successful. Further, at step 512, personal device 107 will inform software application 420 and/or server 102 that the authentication was successful.

At step 513, in response to a successful authentication, personal device 106 and/or server 102 optionally may communicate credentials to interface device 405. The credentials may be communicated to software application 420 via any of the well-known communication methods set forth above and may be transmitted in an encrypted format. the credential information may be provided from and saved locally on interface device 405

In one example, interface device 405 may include a password manager module which may be a part of software application 420 or may be a standalone software application run on interface device 405. A user may save passwords and various information, such as user names, using password manager module. This information may be saved locally on software application 420 or may be saved on a remote server (e.g., server 102) and retrieved by software application 420. Upon being informed that authentication was successful, software application 420 may communicate with the password manager module to obtain certain credentials. Specifically, software application 420 may generate a request for credential information from password manager module and/or transmit the request to password manager module. Upon receiving the request, password manager module may retrieve the requested credential information, either locally or from the remote server, and generate and/or transmit the requested credential information.

Software application 420, upon receiving the credentials, will submit or otherwise transmit the credentials to secure system 410 which will grant access to the user upon validating the credentials. Alternatively, in some circumstances, upon receiving notification that authentication was successful at step 512, interface device 405 may instruct secure system 410 to grant access to the user without the need for credentials. In this manner, the user using personal device 107 may perform authentication on personal device 107 to access secure system 410.

As explained above, authentication system 400 may be employed to grant a user access to a physical location. For example, secure system 410 may be a door that grants access to a secure employment facility. The door may remain locked but may be unlocked using authentication system 400.

In this example, an employee may approach the door of the facility and press a physical button located on interface device 405 located on or near the door. Interface device 405 may initiate communication with the employee's personal device as set forth above. The employee, having registered his or her personal device, may use the personal device to gain access to the facility.

As described above with respect to steps 505-507, after pressing the button to initiate communication, the employee will receive a message on the personal device requesting the user to enter biometric information for authentication. In this example, personal device 107 is programmed to automatically send interface device 405 user identification information in the form of the phone number corresponding to the personal device which is validated by an offsite server.

The employee will next follow prompts on the display of his or her personal device. In this example, the company has programmed application 50 to request a thumbprint first and then perform a face scan, resulting in a two-step authentication approach. Following the prompts on his or her phone, the employee will generate authentication data in the form of a thumb print and a face scan and authenticate the data on the employee's personal device.

The employee's phone will compare the authentication data to authentication data stored locally on the phone. If it is determined that the authentication is successful, the personal device will send a message to interface device 405 informing the interface device that authentication was successful. The interface device may share this message with the offsite server. Interface device will then, via a wired or wireless connection, instruct the door (i.e., secure system 410) to open.

Figure 6B:
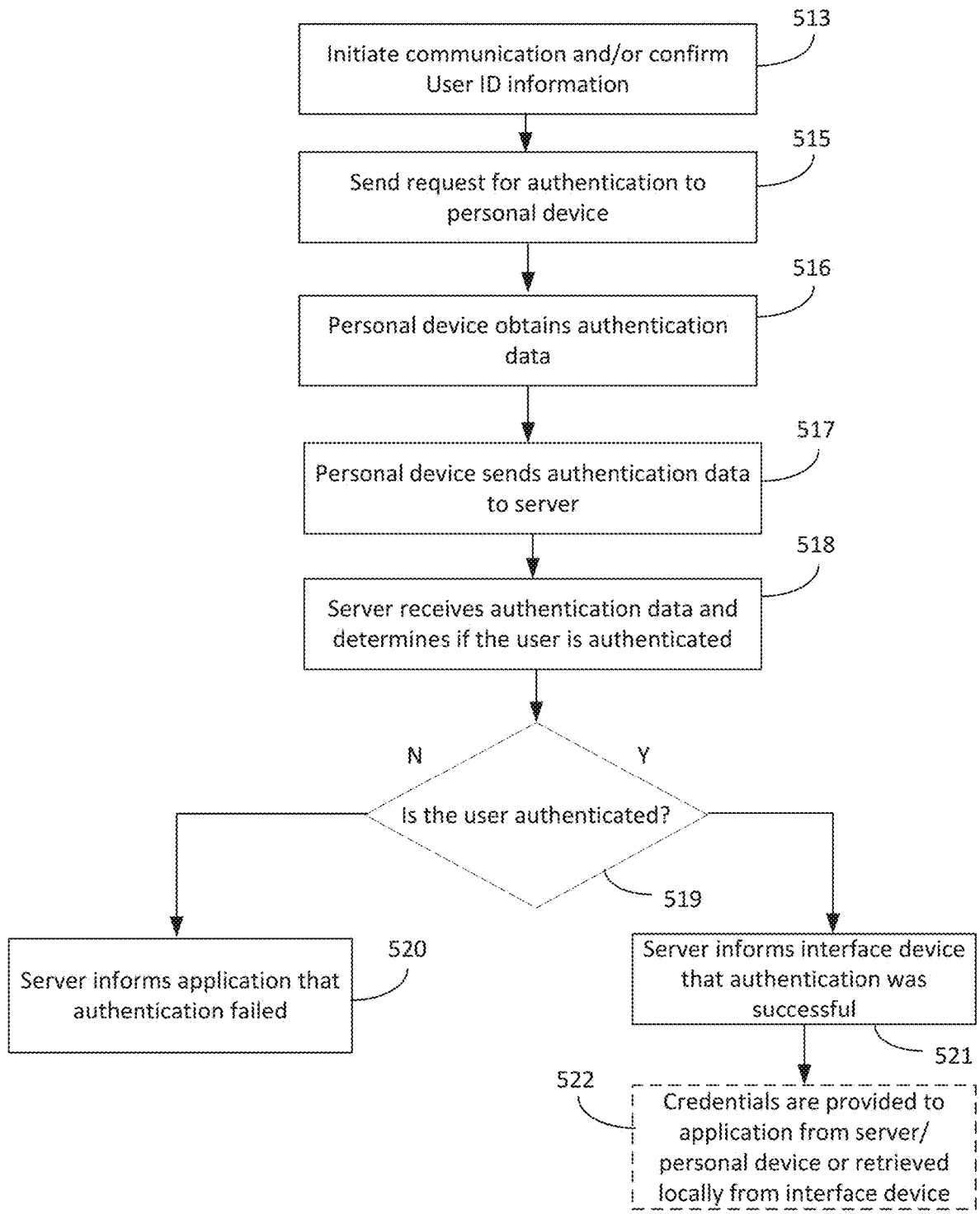

Referring now to FIG. 6B, a flowchart is illustrated detailing the data flow and decisions made in implementing authentication system 400 to authenticate a user via server 102. FIG. 6B starts after software application 420 has been downloaded to interface device 405 and mobile application 318 has been downloaded to personal device 107, as described with respect to steps 501-503 of FIG. 6A. At step 514, a user using mobile application 318 running on personal device 107 may initiate communication between software application 420 running on interface device in the same manner as described with respect to step 504. At step 515, interface device 405 may send and personal device 107 may receive a request for authentication in the same manner described with respect to step 505. At step 516, a user using mobile application 318 running on personal device 107 may obtain authentication data in the same manner described with respect to step 506. At step 517, personal device may send the obtained authentication data directly to server 102 or may send the data to interface device 405 which may relay the data to server 102.

At step 518, server 102 receives the authentication data and determines at decision 519 whether the user is authenticated. This determination will be made in the same manner as described above with respect to step 507 and decision 508, except that server 102 and not personal device 107 will determine whether the user is authenticated. If it is determined at decision 520 that the user is not authenticated, at step 520, the server may inform software application 420 and/or mobile application 318 that authentication failed. Conversely, if server 102 determines at decision 508 that the user is authenticated (i.e., authentication was successful), at step 521 server 102 may inform software application 420 and/or mobile application 318 that the authentication was successful. At step 522, in response to a successful authentication, personal device 106 and/or server 102 optionally may communicate credentials to software application 520. The credentials may be communicated to software application 420 via any of the well-known communication methods set forth above and may be transmitted in an encrypted format. Alternatively, the credential information may be provided from and saved locally on interface device 405.

In this manner the employee may gain access to the employment facility using the employee's personal device. The offsite server may be informed every time the interface device instructs the secure system to open the door. In this way, the offsite server may keep a log of each user that enters the employment facility and at what time. A similar authentication system may be used to exit the facility (of course allowing for emergency exiting). The system that permits exiting the facility may also be in communication with the same offsite server which may generate a log of each user that exits the employment facility and at what time. Accordingly, a log may be generated for the users that enter and exit the facility. The log could be used to automatically track the time worked for hourly employees.

The steps and decisions set forth above with respect to FIGS. 6A and 6B are applicable to lock boxes (e.g., lockers and safety deposit boxes) that may be stored or located in buildings or facilities such as, but not limited to, schools, fitness centers, retail stores, hotels, and banks. The lock boxes may be used to store belongings of a user. The lock boxes may be connected to the Internet via WiFi, Ethernet, or cellular data, or any other well-known communication network. The lock boxes may include or be in communication with interface device 405. On a personal device (e.g., personal device 107), a user may download an application (e.g., application 50) that interfaces with software application 420 of the lock boxes. The user may generate an account linked to the phone number of the personal device associated with the account. An administrator also may manage the lock boxes by communicating with interface device 405. Each lock box may be assigned a unique identifier. To lock or unlock a lock box, a user may initiate communication between interface device 405 and mobile application 107 and provide the unique identifier of the lock box to interface device 405. Interface device 405 may then request authentication data (e.g., a face scan or a thumbprint scan) from personal device 107. Personal device 107 may authenticate the user in the manner described above with reference to steps 505-513. Alternatively, the personal device may transmit the authentication data to a server to authenticate the user in the manner described above with reference to steps 515-522. Once the user is authenticated, software application 420 may lock or unlock the lockbox.

The steps and decisions set forth above with respect to FIGS. 6A and 6B are also applicable to Wi-Fi networks. Specifically, software application 420 may be run on an access point which serves as interface device 405 and may connect one or more devices (computing devices, personal devices, etc.) to a network (e.g., the Internet) via a router. Interface device 405, serving as an access point, may thus generate a wireless connection with other devices. For example, a user may request to access the wireless network via a message sent from the personal device to the access point. When a request is received by the access point, software application 420 running on the access point may send a request to mobile application 318 running on the personal device for an identification number (e.g., phone number). The personal device may receive the request and provide the access point the identification number. Alternatively, the request to join the network may automatically include the identification number. The access point may compare the transmitted identification number to a list of stored numbers within the access point. If the entered identification number matches a registered identification number that i s permitted access, the access point may send a request to the personal device for authentication. Alternatively, the personal device or access point may send the identification number directly to server 102 and server 102 may compare the identification number to registered numbers and inform the access point if the number matches a registered identification number. Once the identification number is confirmed, the personal device may perform the processes described above (e.g., steps 505-508) to authenticate the user of the personal device. Alternatively, the personal device may transmit the authentication data to a server to authenticate the user in the manner described above with reference to steps 515-522. Once the personal device is authenticated, the personal device, or server, will inform the access point running software application 420 that the user has been authenticated. Once the user is authenticated, the access point may grant the personal device access to the wireless network.

As also explained above, authentication system 400 may be employed to grant a user access to a computing device such as an ATM and/or to restricted information and/or functionality on a computing device. In this example, secure system 410 and interface device 405 is the same device and/or interface device 405 is incorporated into and otherwise part of the desktop computer and ATM.

At set forth above with respect to FIGS. 6A-B, the user may download the mobile application to the user's personal device. The user may register and populate a user profile running the mobile application on the personal device. Accordingly, using the personal device, the user may generate biometric authentication data that is stored on the user's personal device. The mobile application will be programmed to store the user identification information, in this case, the user's phone number, name, and bank identification number, on a bank server. To complete registration, the user also inputs ATM login-in credentials to the mobile application which will be saved locally on the personal device in an encrypted format. It is assumed that, for the purposes of this example, software application 420 was loaded on to the ATM by the bank administrators.

To access the ATM, the user will approach the ATM with the personal device. The user will either press a mechanical button on the ATM or a touch screen button on the ATM to initiate communication with the ATM. Alternatively, the ATM may include a proximity sensor and determine that the user's personal device is nearby. The ATM will send a message to the personal device requesting user identification information. Alternatively, the ATM may communicate with the personal device through the bank server.

The user will enter the requested user identification information into the personal device. The ATM will communicate the user identification information to the bank server for validation. Upon confirming that the user is registered with the bank's authentication system, the ATM and/or bank server will request authentication data from the personal device. In this case the requested authentication data involves a thumbprint scan. The user will generate the requested authentication data using the personal device and the authentication data will be compared to authentication data in the user's profile.

If the authentication is successful (i.e., the obtained authentication data is the same or substantially similar to the authentication data in the user's profile), the personal device will inform the ATM and/or bank server that the authentication was successful. The ATM and/or bank server will then request that that the personal device provide ATM credentials which includes the user's ATM pin. The user credentials are stored on the personal device as part of the user's profile. The personal device will automatically generate an encrypted response with the user's ATM credentials.

The bank server will compare the received ATM credentials to those in the bank's database. If the credentials provided match those saved on the bank's server, the server will send a message to the ATM granting the user access to the user's bank account on the ATM. In this manner the bank customer may gain access to ATM using only the user's personal device. This approach reduces the risk of fraudulent access to the user's account.

A user may employ a similar approach to access a computing device such as a work desktop computer. Like in the ATM example, the user may download the mobile application to the user's personal device and register the user profile. However, in this example the credentials will be sign-in credentials for the computing device. The user's profile will be shared with a company server. It is assumed that, for the purposes of this example, software application 420 was loaded on to the work desktop computer by the company administrators.

To access the work computer the user will either press an initiation button on the work computer touch screen or use an input device (keyboard or mouse) to select an initiation button on the display of the work computer. The work computer will proceed to send a request to the personal device for user identification information. In this case the personal device running mobile application 50 will be programmed to automatically respond to the request with the employee's user identification information. The work computer will communicate the user identification information to the company server for validation. Upon confirming that the user is registered with the company's authentication system, the work computer or company server will request authentication data from the personal device. In this case the requested authentication data involves a face scan. The user will generate the requested authentication data using the personal device and the authentication data will be compared to authentication data in the user's profile.

If the authentication is successful (i.e., the obtained authentication data is the same or substantially similar to the authentication data in the user's profile), the personal device will inform the work computer and/or company server that the authentication was successful. In response, the work computer will grant the user access to the work computer. In this manner the bank customer may gain access to the work computer using only the user's personal device.

It is further understood that the personal device that initiates communication at step 504 may be a different personal device than the personal device that receives the request for authentication at step 505, obtains authentication data at step 506, compares the obtained authentication data to registered authentication data at step 507, and authenticates the authentication data at decision 508. Specifically, a first personal device used by a first user may initiate communication and cause authentication system 400 to generate a request for authentication data from a second personal device used by a second user. Where two personal devices implement authorization system 400, the second personal device may directly inform the first personal device whether the authentication was successful at decision 508 and/or may communicate with the second personal device via the server. This approach may be useful where the user of the first personal device does not have authority to access certain locations and needs authorization from a second user to access the location. It is understood that both the first and second personal device may be required to register as set forth above, or, alternatively, only the second personal device may be required to register.

Mobile application 318 and/or mobile application 50 may also include a panic button. If the user presses the panic button for a predetermined time (e.g., 30 seconds), then the mobile application may raise an alarm and/or alert the law enforcement agencies. The panic button may be hidden in a particular area of the user interface. For example, the user may be forced by a thief to authenticate on an online bank account using her personal device. In such a situation, the user may press the panic button for the predetermined time to raise alarm and alert the law enforcement agencies.

Figure 7:
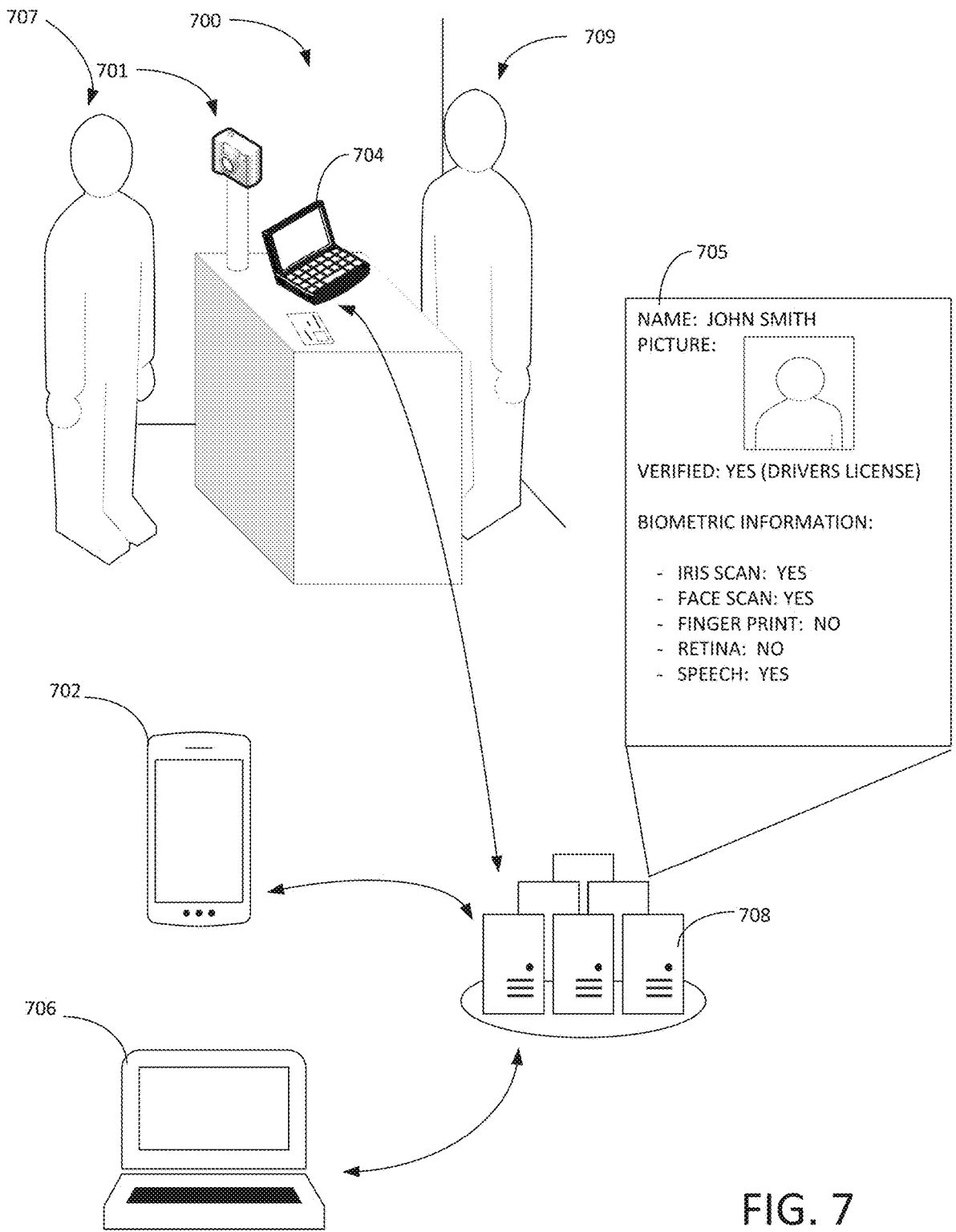
FIG. 7 illustrates an exemplary user registration system.

Referring now to FIG. 7, user registration system 700 is illustrated. User registration system 700 may be used to register a user for an authentication system (e.g., authentication system 100 and/or 400). For example, user registration system 700 may be used by admin user 709, which may be an employer, administrator, or third-party, for example, to register a user 707 in person. In one example, user 707 may arrive at an administrator's office, where admin user 709 may manually verify user 707 in person (e.g., using a government issue ID) and may use registration device 704 to collect information about user 707, such the user's driver's license, picture, retinal scan, face scan, finger print, iris scan, or speech pattern. This approach may be used to manually authenticate user 707 prior to, or as a step in, registering user 707 on the user authentication system, thereby ensuring user 707 is in fact who they claim to be. In this manner, user registration system 700, including registration device 704, may be used to assist in verifying the identity of a user 707 (i.e., in person) during registration. Registration device 704 may further be used to communicate with server 708 running the authentication system to instruct or otherwise cause server 708 to generate a user profile associated with user 707.

User registration system 700 may include sensor 701, personal device 702, registration device 704, computing device 706, and server 708. Sever(s) 708 may be the same or similar to the servers described above with respect to authentication system 100 and/or authentication system 400. Personal device 702 may be the same or similar to personal device 106. Computing device 706 may be the same or similar to computing device 110. For example, computing device 706 may be a laptop, personal computer, mobile phone, tablet or any other computing device having the foregoing features. Sensor 701 may be any sensor device for collecting biometric data. Sensor 701 may be a camera, recording device, scanner, and/or finger print device, for example. Registration system 700 may comprise one or more sensors 701. Sensor may 701 collect biometric data that may be associated with user profile 705 stored on server 708. User profile 705 may include information about user 707, such as the user's name, picture, verification status, biometric information status, face, iris and/or retinal scan, voice recording, finger print information, and/or any other user information.

Registration device 704 may be any computing device having processing power, storage, and network connectivity and may optionally include an input device and a display. It is understood that registration device 704 may be the same as or similar to computing device 110.

Admin user 709 may connect registration device 704 with server 708 (e.g., via the Internet) and request or otherwise instruct server 708 to generate a new profile. Next a new profile (e.g., user profile 705) may be generated by server 708. Alternatively, a profile may already be generated and registration device 704 may be used to update and/or revise user profile 705. Server 708 may prompt admin user 709 to manually verify the identity of user 707. Admin user 709 may do this a number of different ways (e.g., by looking at a government issued ID with a picture, and/or other identifying documentation such as a social security card, school transcript, utility bill, and any other well-known method of in-person authentication). Admin user 709 may verify the identity of user 707 by looking at a single document or via multiple documents. The method used for verifying may be added to the user profile. Admin user 709 may then build the user profile by adding user related information to the user profile (e.g., name, date of birth, height, weight, and/or any other well-known user information) and/or may obtain biometric information using sensor 701. Admin user 709 may use registration device 704 and/or sensor 701 to generate biometric data and/or any other sensor data and may share this information with server 708 and cause server 708 to add the information to the profile. Sensor 701 may collect one type or multiple types of biometric information and/or sensor data to add to user profile 705 (e.g., photograph, finger print, retinal/iris/face scan, voice recording, etc.).

Additionally, information indicative of or corresponding to personal device 702 may be associated with user profile 705 (e.g., device identification number, MAC address, phone number, and/or any other well-known information used for identifying a personal device). To authenticate personal device 702, server 708 may send personal device 708 a one-time-passcode or other unique identifier (e.g., token) and user 707 or admin user 709 may cause mobile device 702 to share the same one-time-passcode or other unique identifier back to server 708, thereby authenticating personal device 702. Additionally, or alternatively, personal device may be instructed by server 708 to acquire biometric information (e.g., a face scan) and to send such biometric information back to server 708 for biometric authentication using biometric information associated with user profile 705. Once user 707 and personal device 702 are associated with profile 705, and user profile 705 is complete, computing device 706 may employ the authentication system to authenticate user 707. For example, user 707 may run the authentication system on computing device 706 to perform biometric authentication facilitated by server 708 and personal device 706 as described above with respect to FIGS. 6A and 6B.

Figure 8:
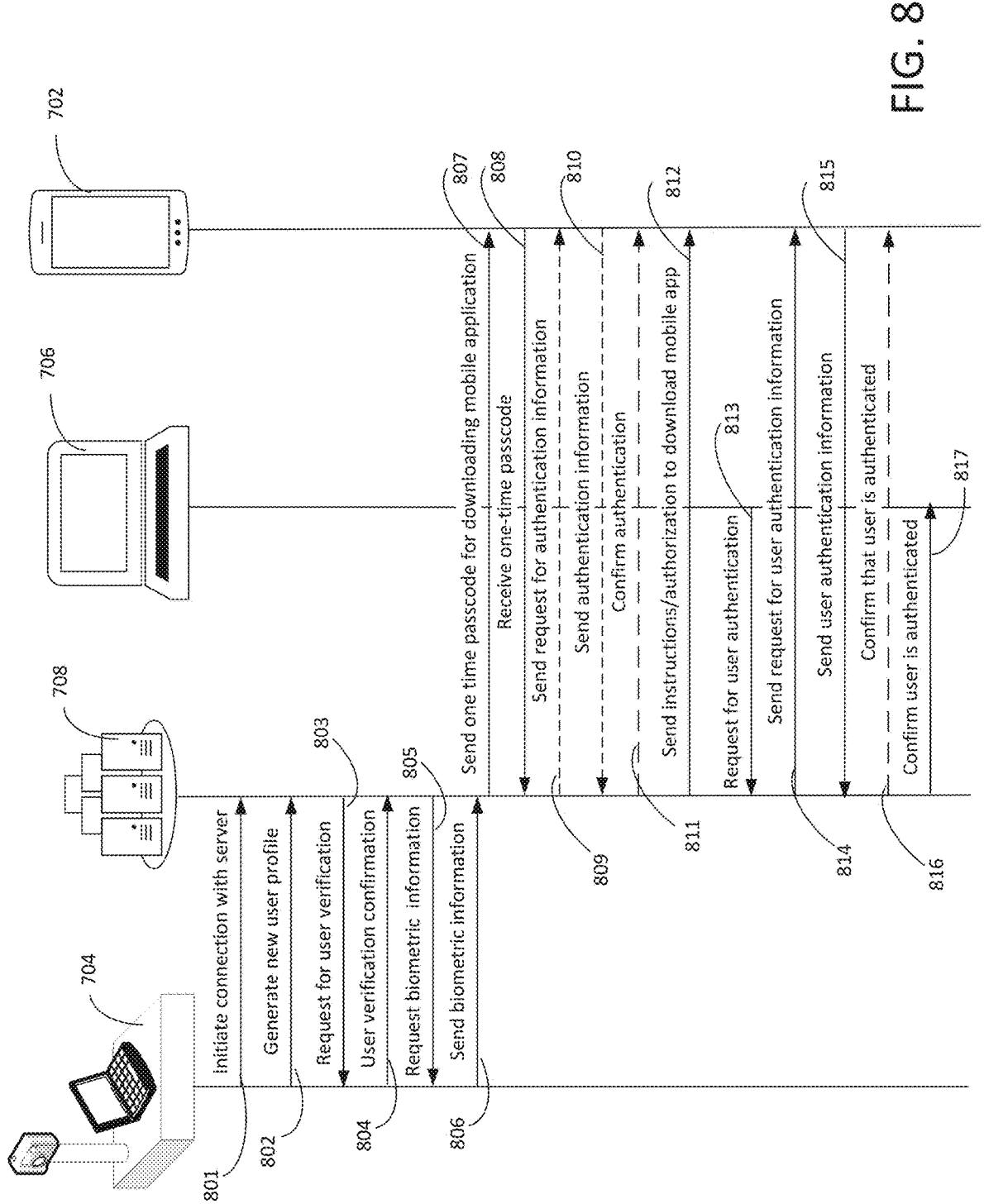
FIG. 8 illustrates operations and decisions made in implementing a registration system.

Referring now to FIG. 8, an exemplary data flow illustrating the tasks and operations performed by a registration system are depicted. As shown in FIG. 8, at step 801, registration device 704 may initiate or otherwise establish a connection with server 708 (e.g., via the Internet or any other well-known wired or wireless connection). At step 802, registration device 704 may cause server 708 to generate a new user profile. The user profile may include personal information, biometric information, medical information and/or any other information about the user. At step 802, the admin user may also cause server 708 to associate the user profile with personal device 702. At step 803, server 708 may send a request for user verification (e.g., via in-person manual verification). The user may then be verified by an on-sight administrator using any well-known manual verification techniques (e.g., using government identification, utility bills, school identification, or the like). At step 808 an administrative user (e.g., admin user) may cause registration device 704 to confirm that the user was manually verified. At step 805, server 708 may request biometric information from registration device 704.

At step 806, an admin user may cause registration device 704 to obtain and/or generator biometric data and/or sensor data and send such data to server 708. Once server 708 receives the biometric information and/or sensor data, at step 807 it may associate such biometric and/or sensor data with the user profile and send a one-time passcode (or other unique identifier) to personal device 702 to authenticate personal device 702. It is understood that personal device 702 may be associated with the user profile at step 801 or at any other time. At step 808, server 708 may receive the one-time passcode from personal device 702, thereby authenticating personal device 702. At optional step 809, sever 708 may send personal device 702 a request for authentication information (e.g., biometric information). At optional step 810, server 708 may receive the authentication information and compare it to user information saved to the user profile (e.g., biometric information) to perform authentication. At optional step 811, service may confirm that authentication was successful if the biometric information generated or obtained by personal device 702 matches or otherwise corresponds to the information saved to the user profile.

Once personal device 702 has been authenticated (e.g., using the one-time-passcode and/or biometric authentication), at step 812, server 708 may send instructions and/or authorization for personal device 702 to download a mobile application for accessing the authentication system via personal device 702. Upon receiving the instructions and/or authorization, personal device 702 may download the mobile application. Alternatively, personal device 702 may download the mobile application at any other time (e.g., prior to step 807) and may even use mobile application to perform steps 808-811.

Once personal device 702 is authenticated, computing device 706 may access the authentication system running on server 708 via a corresponding application running on computing device 706 and may perform user authentication via any user authentication approach described herein (e.g., using the approach describe above with respect to FIGS. 6A and/or 6B). For example, at step 813, computing device 706 may request user authentication from server 708. At step 814, server may receive the request for user authentication and send a request for user authentication to personal device 702. At step 815 personal device 702 may receive the request for user authentication information (e.g., on the mobile application running on personal device 702) and may generate, obtain and/or determine user authentication information and send this information to server 708. Server may receive the user authentication information and compare it to user authentication information saved to the user profile associated with the user and personal device 702. If the user authentication information is the same, matches, or otherwise corresponds to the user authentication information saved to the user profile, server 708 may, at optional step 816, send confirmation to personal device 702 that the user has been authentication and/or may, at step 817, send confirmation to computing device 706 that the user has been authenticated.

It is understood that some or all of the steps of FIG. 8 may be performed in a distributed manner across any number of devices (e.g., computing devices, user devices, personal devices and/or servers). Some or all of the operations of the process flow may be optional and/or may be performed in a different order and/or by different devices.

Figure 9:
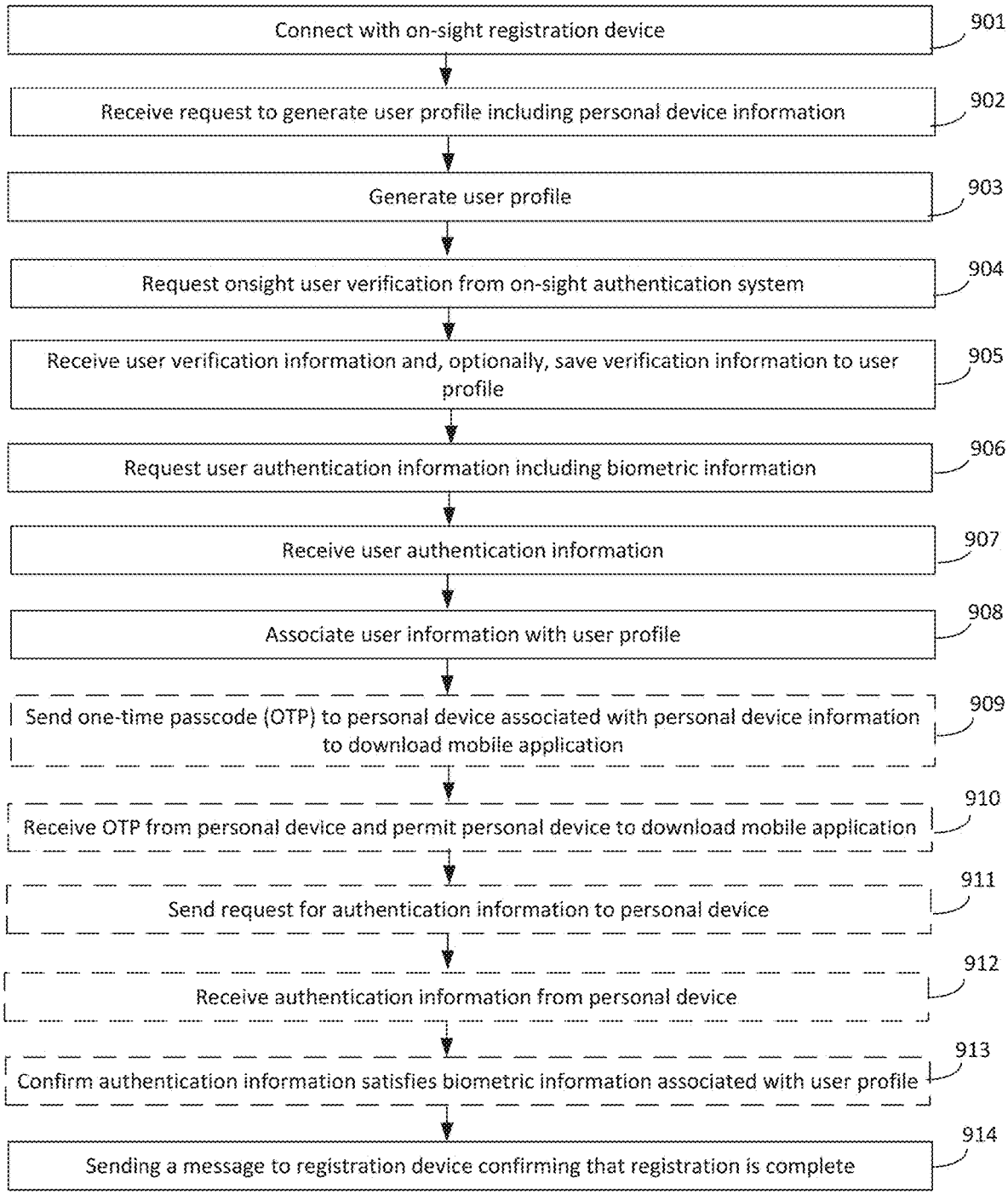
FIG. 9 is a flowchart depicting a data flow and decisions made in implementing a registration system.

Referring now to FIG. 9, a flowchart is illustrated detailing the data flow and decisions made in implementing a registration system (e.g., registration system 700 described above with respect to FIGS. 7 and 8). As mentioned above, registration system 700 may be employed to register a user on a server or other computing device running an authentication system. To initiate the process set forth in FIG. 9, at step 901 a server may connect (e.g., over the Internet) with a registration device which may be located at the same location as a user. At step 902, a server may receive a request to generate a user profile including personal device information. The request may include information about a user (e.g., name, birth date, personal information, medical information, personal device information (e.g., phone number, unique device identifier, and the like), biometric information (e.g., physiological information), and the like). The server may then generate a user profile at step 903. The user profile may include the information about the user and may further be associated with the a personal device based on the personal device information. In one example, the user profile may include the user's name, picture, verification status, face scan, iris scan, retinal scan, voice recording/speech data, or finger print information, or any combination thereof.

At step 904, the server may request on-sight user verification from the registration device. On-sight user verification may include an administrator user (e.g. admin user) verifying a person a user's identity using well-known in-person verification techniques. For example, the administrator may review a government issued photo ID (e.g., a driver's license, military ID, or passport) and/or other identification information (e.g., a birth certificate, social security card, visa, permanent resident card, tax documentation, marriage certificate etc. . . . ). At step 905, the server may receive the confirmation of successful user verification and/or registration information (e.g., information used to perform on-sight verification such as an image of a government identification or utility bill) from the registration device and may optionally save the verification information to the user profile. At step 906, server 708 may request user authentication information (e.g., biometric information) from the registration device. At step 907, the receiver may receive the user authentication information, and may save the user information with the user profile on the server.

At optional step 909, the server may optionally send a one-time passcode and/or unique identifier (e.g., unique token) to the personal device associated with the user profile to confirm the user is in possession of the associated personal device. At optional step 910, the server may receive the same one time passcode (and/or unique identifier). At optional step 911, the server may optionally send a request for authentication information to the personal device associated with the user profile (e.g., a request for a face scan). At optional step 912, the server may receive the authentication information from the personal device. At step 913, the server may optionally confirm that the authentication information received from the personal device matches, satisfies, or otherwise corresponds to the biometric information associated with and saved to the user profile. At step 914, the server may send a message to the registration device confirming that the registration is complete.

It is understood that some or all of the steps of FIG. 9 may be performed in a distributed manner across any number of devices (e.g., computing devices, user devices, personal devices and/or servers). Some or all of the operations of the process flow may be optional and/or may be performed in a different order and/or by different devices.

Authentication system 100 and/or authentication system 400 may be used by users (i.e., authorizers) to authorize other individual's access to a location or to information. For example, an individual in one location may attempt to gain access to digital information or a location while an authorizer is in different location. A request for authentication data may be generated and sent to the authorizer's personal device. Upon receiving the request, the authorizer may grant the individual access to the digital information or location by generating authentication data, such as biometric data, using the personal device and authenticating the data as set forth above. Upon authenticating the authentication data, the personal device may inform the server that the remote individual is granted permission to access the location or digital information and the server may then grant the individual access to the location or digital information. The server may keep a log of the permissions granted by the authorizer.

Authentication system 100 and/or authentication system 400 may be used to access a forgotten password or reset a password. Often times an administrator may be tasked with retrieving the employee's forgotten password from a password database. Also, company protocol may require the user to change the employee's password to a new password. However, authentication system 100 and/or authentication system 400 may allow the employee that forgot their password to access their password or reset their password using authentication data. For example, upon failing to login, mobile application 50 or mobile application 318 may prompt the employee to input authentication data, such as biometric data, on a personal device, such as a personal device. The user may then generate the authentication data and the authentication may be authenticated as explained above. Upon authenticating the data, mobile application 50 or mobile application 318 may instruct the server to provide the forgotten password, provide a new password, or permit the user to generate a new password.

Authentication system 100 and/or authentication system 400 may be used to provide a user access to websites without user credentials (e.g., username and password). Upon accessing a website corresponding to application 220, application 220 may immediately request user authorization to access the website. For example, application 220 may prompt the user to enter a mobile phone number and may send a request for authentication to that mobile phone number. The user may then obtain authentication data and mobile application 318 may perform authentication to grant the user access to the website. Alternatively, authentication may be performed on computing device 110.

Authentication system 100 and/or authentication system 400 may be used as a person locator. For example, a user's personal device may receive a request from another device to input biometric data to provide assurances that the person is using and physically with the personal device. The user receiving the request may generate authentication data which may be authenticated as described above. A message will then be generated and sent to the requesting device indicating whether or not the authentication data was authenticated. The message may also include the location of the personal device.

Authentication system 100 and/or authentication system 400 may be used to permit access key box having a physical key inside for access to a residence or building or may permit access to a residence or building. For example, a real estate professional may gain access to a key box having a key inside by accessing authentication system 100 or authentication system 400 from a personal device. The real estate professional may generate a request for authentication data by actuating an authentication button on the key box. Alternatively, the real estate professional may generate the request by accessing mobile application 318. The request for authentication data may be sent to the personal device of the real estate professional. Upon receiving the request, the real estate agent may generate the requested authentication data using the personal device. The authentication data may then be authenticated as described above. Upon authenticating the authentication data, the code needed to open the key box may be sent to the real estate agent's personal device from the server or the server may send a message directly to the key box instructing the key box to open. Additionally, a similar process as described below may be used to prove the real estate agent is who they claim to be to obtain approval from a homeowner for a visit.

Authentication system 100 and/or authentication system 400 may be used to permit a homeowner to modify a home security system, including system settings and/or password information. For example, the home owner may actuate a button on a security system keypad or may access a security system website or application to generate a request for authenticate data to be sent to the personal device. The user may generate the authentication data on the personal device and the data may be authenticated as explained above. Once authenticated, the security system may permit the user to change the security system settings.

Authentication system 400 may be used to verify the identity of a voter at a voting booth to ensure that the voter is present in the voting booth. Once entering the voting booth, the person may actuate a button that sends a request to the personal device to generate authentication data. The voting booth system may additionally require the user to enter their personal device number. Upon receiving the request for authentication data, the voter may generate the requested authentication data and the data may be authenticated as described above. If the authentication data is authenticated, a ballot may be submitted. A similar system may also be employed for voting using a personal device. For example, a website or application for submitting a vote using a personal device may require the user to generate authentication data and upon generating authentication data, the authentication may be authenticated as described above. If the authentication data is authenticated, the ballot may be submitted.

Authentication system 100 may be used to authenticate owners of social media accounts and/or change the settings of a social media account. For example, when generating a social media account, the social media service may send a request for authentication to the personal device corresponding to that account. The user of the personal device may generate authentication data and the data may be authenticated as explained above. Authentication system 100 may also implement the procedure when a user tries to reactivate an account after it was deactivated. A similar approach may be used more generally in the creation and maintenance of any digital account. It is understood that this approach may reduce the risk of fake accounts.

Authentication system 100 may be used to verify that a delivery has been completed. Once the delivery is made, the delivery person using a personal device may generate and send a message to the server confirming that the delivery is complete. Alternatively, an automated message may be generated based on the location of the personal device of the delivery person. In response to receiving the message that the delivery is complete, a request may be generated by the server and sent to a personal device of either the intended recipient or the delivery person requesting authentication data to confirm that the delivery is complete. The recipient of the request may then generate authentication data and authenticate the data using the respective personal device, as explained above. Upon authenticating the data, the personal device that received the request will send a message to the server confirming that the delivery is complete. In one example, if the intended recipient of the package is not present at the time of delivery, the delivery person, using the personal device of the delivery person, may send a request for authorization to leave the package at the delivery location corresponding the intended recipient or at certain location. The intended recipient of the package may generate authentication data in response to the request and the authentication data may be authenticated as described above. Upon authenticating the authentication data, the personal device of the intended recipient may generate a message to the server and/or personal device of the delivery person, indicating that the delivery person is authorized to leave the package at the delivery location corresponding the intended recipient or at certain location.

Authentication system 100 may be used to restrict access to digital files and/or content to only those users that have been authorized to access the files and/or content. For example, a document may require a user to enter authentication data by generating a phone number upon opening the document. The user may enter the phone number associated with his or her personal device and the mobile number may be communicated to the server. The server may then send the personal device associated with the phone number a request for authentication data. The individual attempting to open the document will then generate the authentication information and authenticate the authentication information using the personal device, as explained above. Upon authenticating the authentication data, the user will be permitted access to the document.

Authentication system 100 may be used to certify a file or document or attach a certified electronic signature to a file or document. For example, an agreement may need to be signed by an individual. Upon opening the digital file on a computing device, a the individual may either be prompted to provide certification or may request to do so. In response, a request for authentication data will be generated and sent to the personal device of the user. The system may request the individuals mobile number, if this information is not already known. Using the personal device, the individual will then generate authentication data and the authentication data will be authenticated, as described above. Upon authenticating the authentication data, the document will be certified by the individual. This may involve attaching a certified electronic signature.

Authentication system 100 may be used for on-demand approval of certain actions. For example, an employee may need approval for a work expenditure such as office supplies. An employee may use mobile application 318 or may access a URL such as a company website to submit a request for authorization to purchase the work expenditure. The request may be automatically routed to a known authorizer or the employee may direct the request to a particular individual for authorization. The request may include an amount and/or information about the proposed purchase. The authorizer may receive the request on the personal device of the authorizer. The request may prompt the authorizer to generate authentication data to approve the request or alternatively deny the request. The authorizer may generate authentication data and the mobile application may authenticate authentication data information using the personal device, as explained above. Upon authenticating the authentication data, the personal device of the authorizer may inform the requestor that expenditure has been approved. For example, the message may be sent to the URL and/or requestor's personal device. If authentication fails or if the authorizer denies the request, the personal device of the authorizer may inform the personal device of the requestor that request has not been approved. A log of the requests, approvals, and denials may be generated.

Authentication system 100 may be used to access an online account (e.g. online bank account). For example, a user may visit a website to access the online account. The website may prompt the user to enter their personal device number or other user identification information. The user may then enter their personal device number which may be sent to the server which transmits a request for authentication to the personal device corresponding to the personal device number. The user may generate authentication data and the personal device may authenticate the authentication data, as described above. Upon, authenticating the authentication data, the personal device may inform the server that the user has been authenticated and the user may be granted access to the online account.

It is understood that managed service providers (MSPs) may implement and manage authentication system 100, authentication system 400, and/or authentication system 600 and consequently have the ability to manage password servers and dynamic passwords and/or otherwise implement the procedures and systems described herein. MSPs may manage authentication data provided by users and request additional authentication data. For example, MSPs may ensure biometric data is up-to-date.

It should be understood that any of the computer operations described herein above may be implemented at least in part as computer-readable instructions stored on a computer-readable memory. It will of course be understood that the embodiments described herein are illustrative, and components may be arranged, substituted, combined, and designed in a wide variety of different configurations, all of which are contemplated and fall within the scope of this disclosure.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for user registration on an authentication system, the method comprising:
    connecting to a computing device;
    receiving a request to generate a user profile associated with a user and at least one personal device;
    generating a user profile corresponding to the user and the at least one personal device;
    requesting onsite user verification from the computing device;
    receiving user verification confirmation from the computing device;
    requesting first biometric information corresponding to the user from the computing device;
    receiving the first biometric information corresponding to the user from the computing device;
    associating the first biometric information with the user profile;
    sending, after receiving user verification from the computing device and receiving the first biometric information, a one-time-passcode to the at least one personal device;
    receiving the one-time-passcode from the at least one personal device;
    requesting, after receiving the one-time-passcode, second biometric information from the at least one personal device;
    receiving the second biometric information from the at least one personal device; and
    determining that the second biometric information corresponds to the first biometric information.

2. The method of claim 1, further comprising sending message to the computing device confirming that registration is complete based on determining that the second biometric information corresponds to the first biometric information.

3. The method of claim 1, further comprising receiving the user verification information from the computing device and associating the verification information with the user profile.

4. The method of claim 1, wherein the first biometric information is finger print data.

5. The method of claim 1, wherein the first biometric information is speech data.

6. The method of claim 1, wherein the first biometric information is a face scan.

7. The method of claim 1, wherein the first biometric information is a retinal scan.

8. The method of claim 1, wherein the first biometric information is an iris scan.

9. The method of claim 1, further comprising:
    receiving a request for authentication from a second computing device, the request associated with the user profile; and
    requesting third biometric information from the at least one personal device in response to the request.

10. The method of claim 9, further comprising:
    receiving the third biometric information corresponding to the user from the at least one personal device;
    determining the third biometric information corresponds to the first biometric information; and
    sending a successful authentication message to the second computing device based on the third biometric information corresponding to the first biometric information.

11. An authentication system for registering a user, the authentication system comprising:
    memory configured to store computer-executable instructions; and
    at least one computer processor configured to access the memory and execute the computer-executable instructions to:
        connect to a computing device;
        receive a request to generate a user profile associated with the user and at least one personal device;
        generate a user profile corresponding to the user and the at least one personal device;
        request onsite user verification from the computing device;
        receive user verification confirmation from the computing device;
        request first biometric information corresponding to the user from the computing device;
        receive the first biometric information corresponding to the user from the computing device;
        associate the first biometric information with the user profile;
        send, after receiving user verification from the computing device and receiving the first biometric information, a one-time-passcode to the at least one personal device;
        receive the one-time-passcode from the at least one personal device;
        request, after receiving the one-time-passcode, second biometric information from the at least one personal device;
        receive the second biometric information from the at least one personal device; and
    determine that the second biometric information corresponds to the first biometric information.

12. The authentication system of claim 11, wherein the at least one computer processor is further configured to access the memory and execute the computer-executable instructions to:
    send a message to the computing device confirming that registration is complete based on determining that the second biometric information corresponds to the first biometric information.

13. The authentication system of claim 11, wherein the at least one computer processor is further configured to access the memory and execute the computer-executable instructions to:
receive the user verification information from the computing device and associate the verification information with the user profile.

14. The authentication system of claim 11, wherein the first biometric information comprises one or more of finger print data, speech data, a face scan, a retinal scan, or an iris scan.

15. The authentication system of claim 11, wherein the at least one computer processor is further configured to access the memory and execute the computer-executable instructions to:
receive a request for authentication from a second computing device, the request associated with the user profile; and
request third biometric information from the at least one personal device in response to the request.

16. A non-transitory computer-readable medium for registering a user on an authentication system, comprising instructions stored thereon that, when executed on a processor, perform the steps of:
connecting to a computing device;
receiving a request to generate a user profile associated with the user and at least one personal device;
generating a user profile corresponding to the user and the at least one personal device;
requesting onsite user verification from the computing device;
receiving user verification confirmation from the computing device;
requesting first biometric information corresponding to the user from the computing device;
receiving the first biometric information corresponding to the user from the computing device;
associating the first biometric information with the user profile;
sending, after receiving user verification from the computing device and receiving the first biometric information, a one-time-passcode to the at least one personal device;
receiving the one-time-passcode from the at least one personal device;
requesting, after receiving the one-time-passcode, second biometric information from the at least one personal device;
receiving the second biometric information from the at least one personal device; and
determining that the second biometric information corresponds to the first biometric information.

17. The non-transitory computer-readable medium of claim 16, further comprising instructions stored thereon that, when executed on the processor, perform the step of:
sending a message to the computing device confirming that registration is complete based on determining that the second biometric information corresponds to the first biometric information.

18. The non-transitory computer-readable medium of claim 16, further comprising instructions stored thereon that, when executed on the processor, perform the step of:
receiving the user verification information from the computing device and associating the verification information with the user profile.

19. The non-transitory computer-readable medium of claim 16, wherein the first biometric information comprises one or more of finger print data, speech data, a face scan, a retinal scan, or an iris scan.

20. The non-transitory computer-readable medium of claim 16, further comprising instructions stored thereon that, when executed on the processor, perform the steps of:
receiving a request for authentication from a second computing device, the request associated with the user profile; and
requesting third biometric information from the at least one personal device in response to the request.

* * * * *